(12) United States Patent
Nonaka

(10) Patent No.: US 8,115,601 B2
(45) Date of Patent: Feb. 14, 2012

(54) CONTROL DEVICE, RFID TAG READING SYSTEM AND RFID TAG READER

(75) Inventor: Nobuyuki Nonaka, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1052 days.

(21) Appl. No.: 12/021,821

(22) Filed: Jan. 29, 2008

(65) Prior Publication Data

US 2009/0021353 A1 Jan. 22, 2009

(30) Foreign Application Priority Data

Feb. 6, 2007 (JP) ................................. 2007-027340

(51) Int. Cl.
*H04Q 5/22* (2006.01)
(52) U.S. Cl. .................... 340/10.2; 340/10.1; 340/572.1
(58) Field of Classification Search .................. 340/10.1, 340/10.2, 10.3, 10.31, 10.33, 572.1; 455/179.1; 370/431–463
See application file for complete search history.

(56) References Cited

U.S. PATENT DOCUMENTS

| | | | | |
|---|---|---|---|---|
| 7,411,921 | B2* | 8/2008 | Strong et al. | 370/328 |
| 2007/0042733 | A1* | 2/2007 | Tomioka | 455/179.1 |
| 2007/0052524 | A1* | 3/2007 | Tanaka | 340/10.2 |

* cited by examiner

*Primary Examiner* — Nabil Syed
(74) *Attorney, Agent, or Firm* — Arent Fox, LLP

(57) ABSTRACT

It is an object of the present invention to avoid communication congestion and collision by effectively assigning a unit radio channel for transmission and reception to RFID tag readers using the same unit radio channel group. Herein disclosed is an RFID tag reading system for reading an RFID tag using a reader/writer used in a low-output RFID tag reading system capable of using channels 1 to 9 available for a reader/writer used in a high-output RFID reading system and channels 10 to 14 not available for a reader/writer used in the high-output RFID tag reading system. The RFID tag reading system receives an RSSI indicative of a received radiowave strength on each of unit radio channels measured by the reader/writers, and assigns channels 1 to 14 preferentially to channels 1 to 9 based on the RSSI.

9 Claims, 21 Drawing Sheets

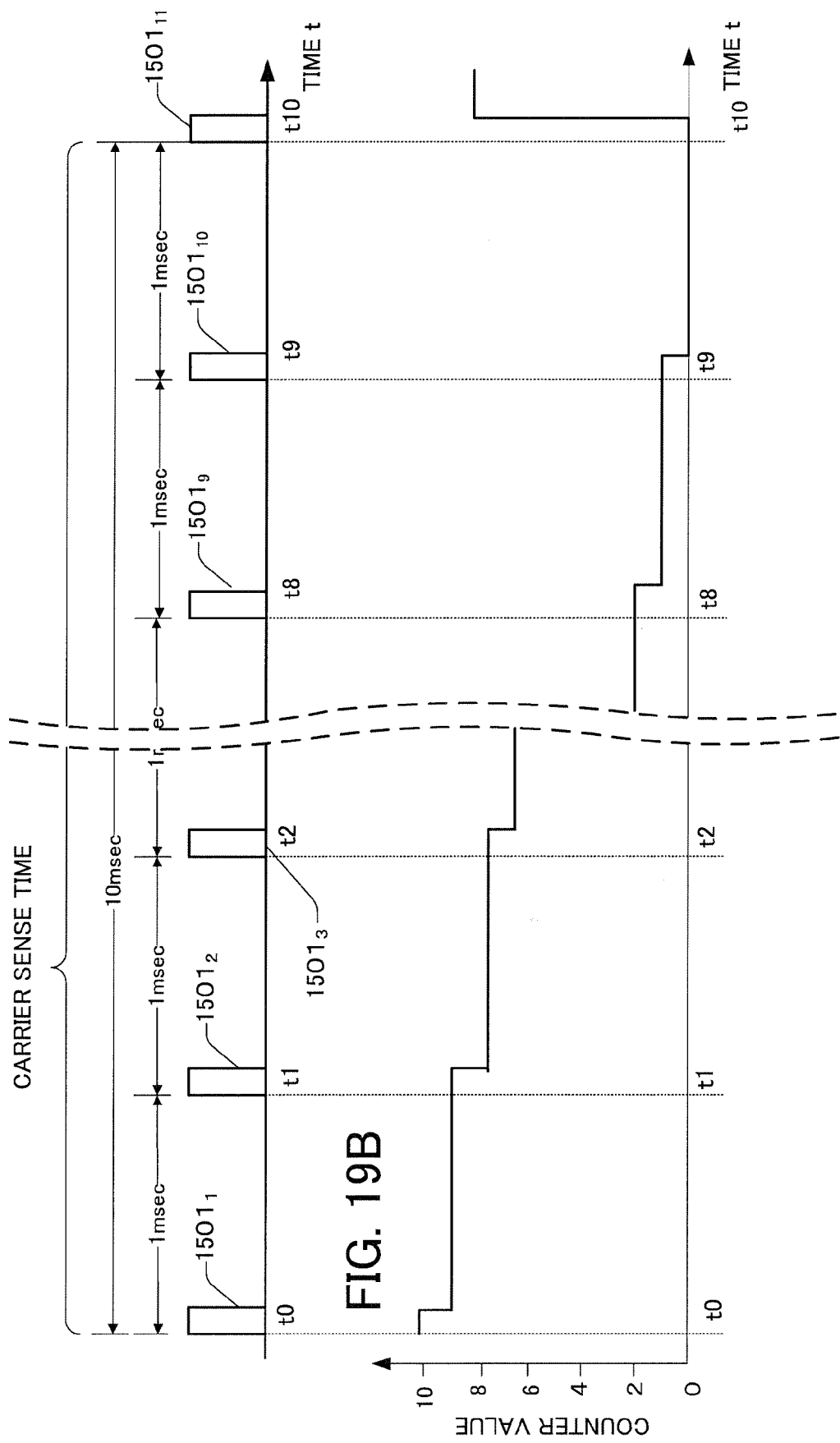

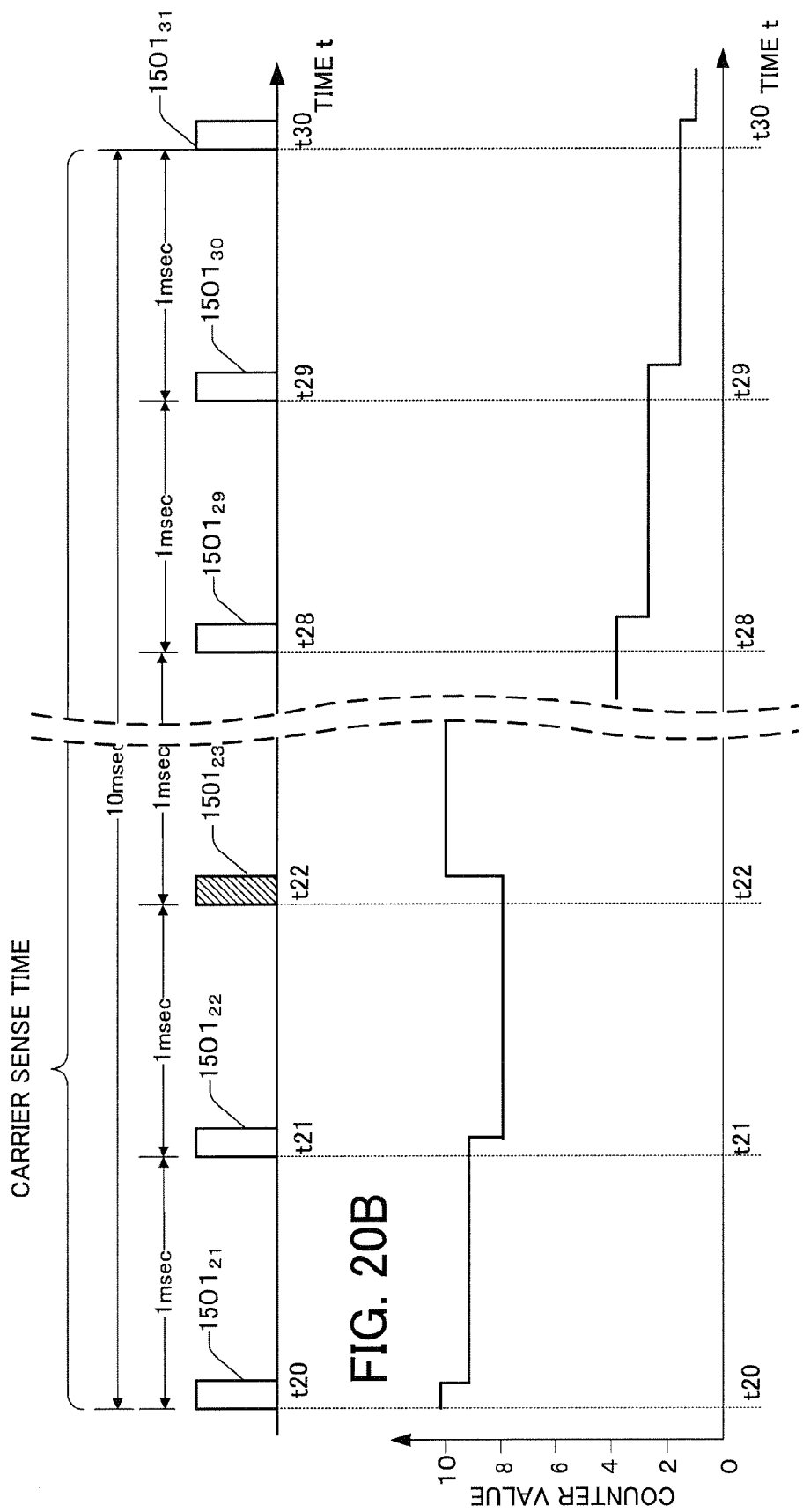

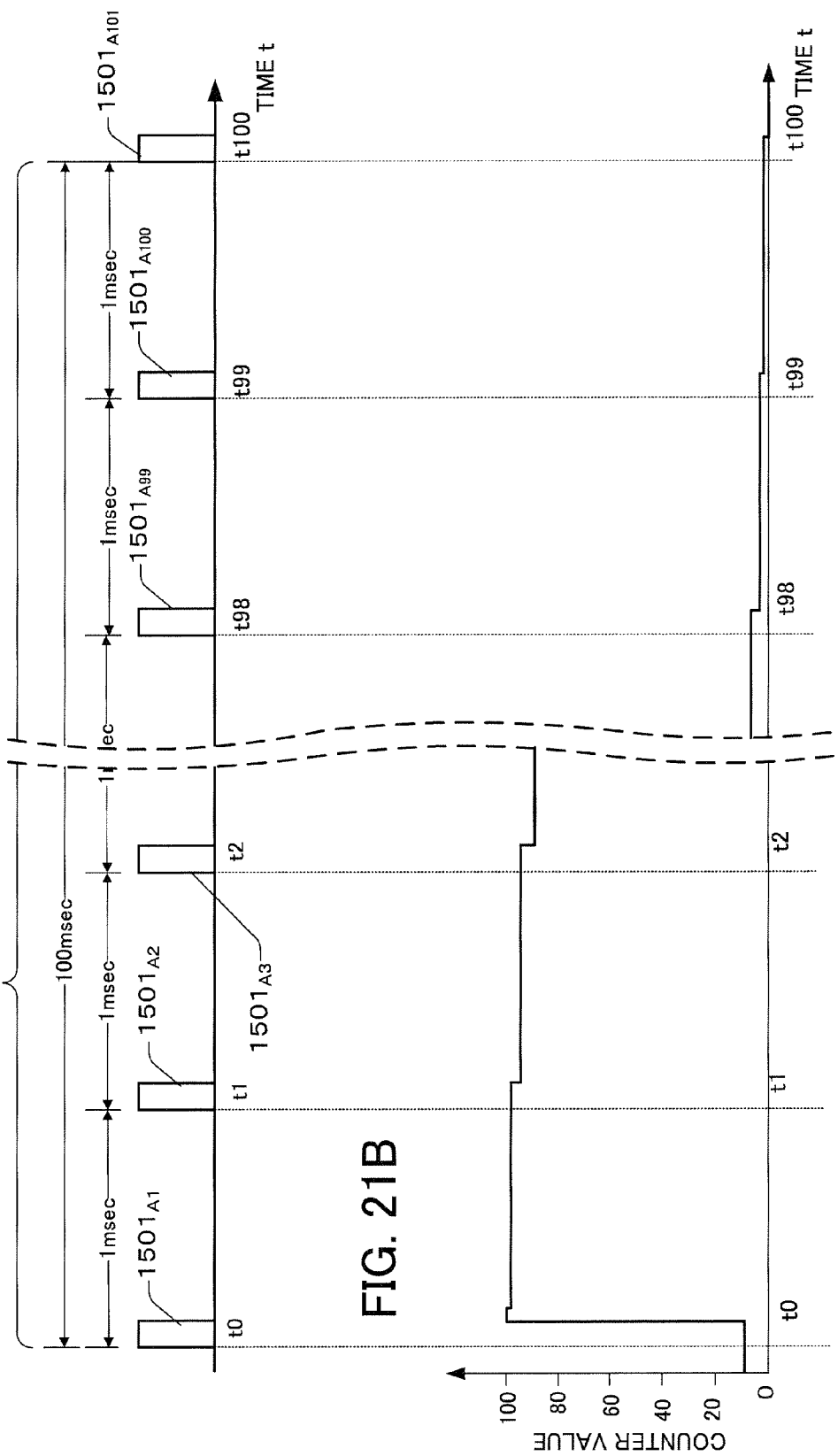

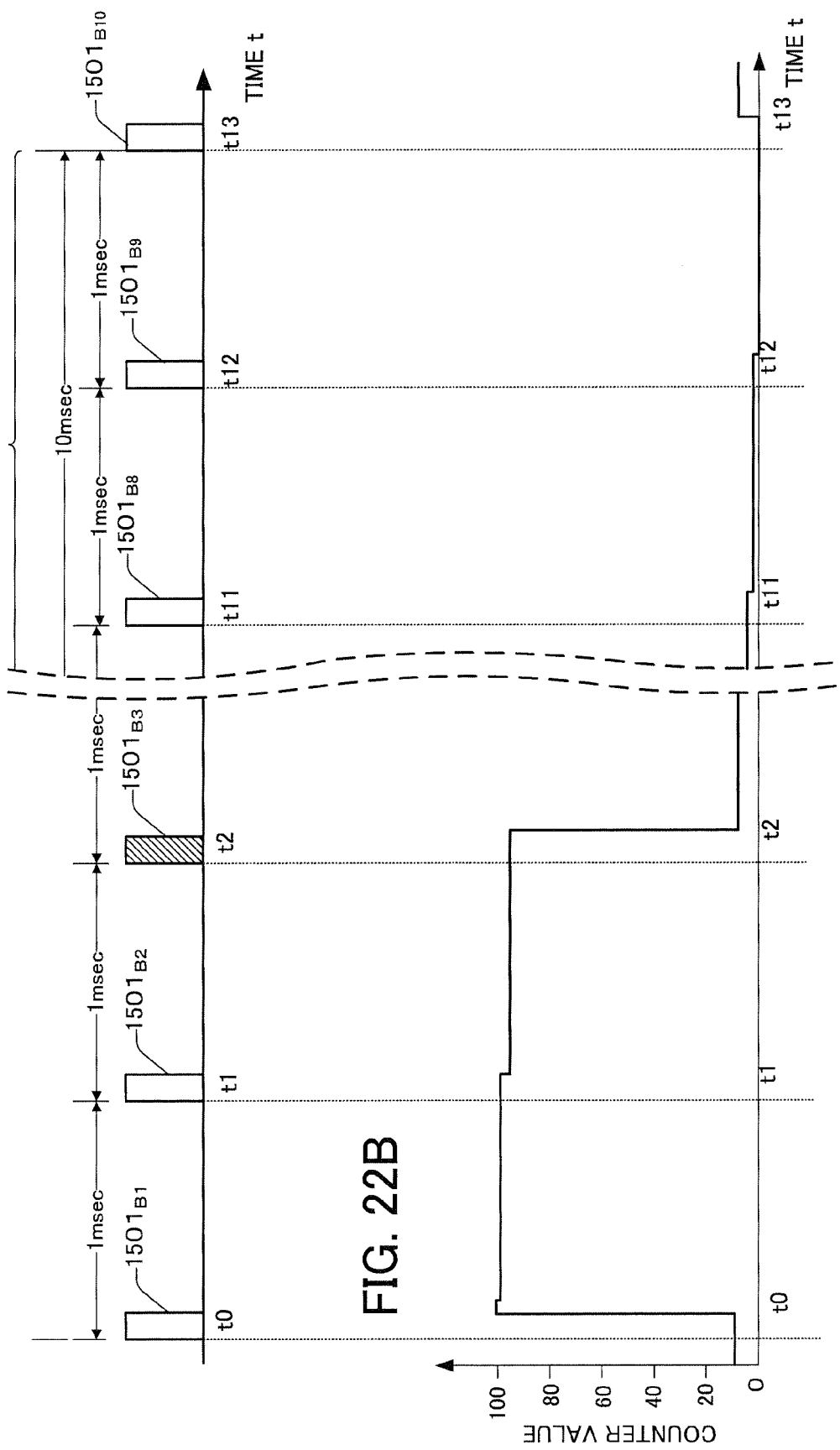

CONTROL DEVICE, RFID TAG READING SYSTEM AND RFID TAG READER

This application is based on and claims the benefit of priority from Japanese Patent Application No. 2007-027340, filed on 6 Feb. 2007, the content of which is incorporated herein by reference.

BACKGROUND OF THE INVENTION

1. Field of the Invention

The present invention relates to a control device, an RFID tag reading system and an RFID tag reader. More specifically, the present invention relates to a control device and an RFID tag reading system for a reader (for example, a reader/writer) having a reading function for reading so-called RFID tags (radio frequency identification tag, also called as electronic tag), and such an RFID tag reader.

2. Related Art

Among so-called RFID tags, a 950 MHz band passive tag has an available frequency band assigned, which is from 950 MHz to 956 MHz. In this available frequency band, a band actually available in Japan is from 952 MHz to 955 MHz except a guard band. The band can be divided into up to 14 a unit radio channels of 0.2 MHz each, with consideration for spurious regions.

For a 950 MHz band passive tag system, a high-output 950 MHz band passive tag system which can output up to 30 dBm in the band of 952 MHz to 955 MHz, and a low-output 950 MHz band passive tag system which can output up to 10 dBm are disclosed. The high-output 950 MHz band passive tag system is a reader/writer requiring licensing of radio broadcasting, installed and operated in particular premises, which is mainly used for business purposes. On the contrary, the low-output 950 MHz band passive tag system is a reader/writer not requiring licensing, which is for consumer use such as reading a single or small number of passive tags in a stock room of retail shops and supermarkets or in a production line of factories (e.g., Draft Report of The Low-Power Radio Systems Committee, Information and Communications Technology Sub-Council, Information and Communications Council, online, searched on Nov. 16, 2006, see URL: http://www.soumu.go.jp/s-news/2005/pdf/050808_5_1.pdf, hereinafter referred to as Non-patent Document 1).

An RFID tag reader of the high-output 950 MHz band passive tag system and an RFID tag reader of the low-output 950 MHz band passive tag system can be used in the same premises. For example, an RFID tag reader of the high-output 950 MHz band passive tag system may be located at the entrance of a room. Employees can be equipped with an ID card with an RFID tag included for authentication, and the tag read by the RFID tag reader of the high-output 950 MHz band passive tag system for security management. In addition, an RFID tag reader of the low-output 950 MHz band passive tag system can be installed in the vicinity of each PC in the same room, to check the user's usage permission for the PC by reading the RFID tag for authentication. In many other cases, an RFID tag reader of the high-output 950 MHz band passive tag system and an RFID tag reader of the low-output 950 MHz band passive tag system can be installed in the same premises.

In both the high-output 950 MHz band passive tag system and the low-output 950 MHz band passive tag system, the RFID tag reader can be unable to read the RFID tag properly in the presence of another RFID tag reader in the vicinity thereof, due to: interference between two RFID readers, or between an RFID reader and an RFID tag not designated therefor; and communication congestion and collision due to interference between emitted radiowaves or channel interference in the same frequency band.

It is an object of the present invention to provide a technology for avoiding communication congestion and collision by effectively assigning a unit radio channel for transmission and reception to RFID tag readers using the same unit radio channel group.

SUMMARY OF THE INVENTION

In order to solve the foregoing problems, the present invention is characterized as follows.

In accordance with a first aspect of the present invention, there is proposed a control device (for example, a reader/writer control device) for controlling an RFID tag reader.

The control device is characterized in that the control device comprises a carrier sense control portion (for example, a carrier sense control unit) for receiving information indicative of a received radiowave strength (for example, RSSI) in a unit radio channel used for transmission and reception with an RFID tag, and storing information indicative of availability of a plurality of radio channels (for example, a carrier sense result table) based on the information indicative of the received radiowave strength; and, a radio channel control portion (for example, transmission and reception control unit), capable of reading a first RFID tag operable to perform transmission and reception using at least one first unit radio channel (for example, channels 1 to 9) and a second RFID tag operable to perform transmission and reception using at least one second unit radio channel (for example, channels 10 to 14), for determining whether any one of the second unit radio channels is available based on the information indicative of availability of each of the unit radio channels, determining whether any one of first unit radio channels is available in a case in which it is determined that any one of the second unit radio channels is not available, and assigning a unit radio channel for transmission and reception with RFID tags based on the result of the determinations.

This control device enables the second RFID tag reader to use the second unit radio channel prior to the first unit radio channel. Therefore, reading by the first RFID tag reader is less likely blocked by the second RFID tag reader, and also, reading by the second RFID tag reader is less likely blocked by the first RFID tag reader. As a result, reading efficiency of the RFID tag can be improved.

The aforementioned control device may be further characterized as follows. That is, in a case in which a continuous transmission time, for which the same unit radio channel can be continuously used after the unit radio channel used for transmission and reception with the second RFID tag has been assigned and the transmission and reception has been started, has elapsed, the radio channel control portion assigns another unit radio channel different from the unit radio channel so far used for transmission and reception. This control device can eliminate a waste of time so far required for reading the RFID tag during a transmission suspension period, thereby further improving reading efficiency of the RFID tag.

The aforementioned control device may be further characterized as follows. That is, the control device further comprises: a first RFID tag reader (for example, a reader/writer used in a high-output RFID tag reading system) capable of using at least one of the first unit radio channels; and a second RFID tag reader (for example, a low-output REID tag reader) capable of using at least one of the second unit radio channels, wherein the radio channel control portion assigns a unit radio channel used for transmission and reception with an RFID to the second RFID tag reader, and the radio channel control portion receives information indicative of a received radiowave strength in each of the unit radio channels measured by the second RFID tag reader.

The aforementioned control device may be further characterized as follows. That is, in this control device, the radio channel control portion assigns another unit radio channel for transmission and reception with the second RFID tag after the continuous transmission time has elapsed without waiting for a transmission suspension period.

The above-mentioned control device may be further characterized as follows. That is, the carrier sense control portion assigns unit radio channels for carrier sense to the second RFID tag reader so that the second RFID tag reader performs carrier sense on each of the unit radio channels. This control device can monitor the availability of each of the unit radio channels even while a transmission and reception process is performed. Therefore, the control device can immediately start, continue, and resume the transmission and reception using a unit radio channel, which is monitored as being vacant channel, thereby eliminating a waste of time so far required for reading the RFID tag during a transmission suspension period, and consequently improving reading efficiency of the RFID tag.

In accordance with a second aspect of the present invention, there is proposed a control device (for example, a reader/writer control device) capable of controlling a second RFID tag reader (for example, a reader/writer used in a low-output RFID tag reading system) capable of using at least one first unit radio channel (for example, channels 1 to 9) available for a first RFID tag reader (for example, a reader/writer used in a high-output RFID tag reading system) and at least one second unit radio channel (for example, channels 10 to 14) not available for the first RFID tag reader.

This control device is characterized in that the control device comprises a radio channel control portion (for example, a transmission and reception control unit) for assigning a unit radio channel used for transmission and reception with an RFID to the second RFID tag reader; and a carrier sense control portion (for example, a carrier sense control unit) for receiving information indicative of a received radiowave strength (for example, RSSI) in each of unit radio channels measured by the second RFID tag reader, storing information indicative of availability of each of the unit radio channels (for example, a carrier sense result table) based on the information indicative of the received radiowave strength, wherein the radio channel control portion determines, in a case in which a continuous transmission time, for which the same unit radio channel can be continuously used after the second RFID tag started the transmission and reception, has elapsed, whether any one of the second unit radio channels is available based on the information indicative of availability of each of the unit radio channels (for example, RSSI, or a flag indicative of the availability set in accordance with the RSSI), determines whether any one of the first unit radio channels is available in a case in which it is determined that any one of the second unit radio channels is not available, and assigns another unit radio channel different from the unit radio channel so far used by the RFID tag reader for the transmission and reception to the RFID tag reader based on the result of the determinations.

This control device enables the second RFID tag reader to use the second unit radio channel prior to the first unit radio channel. Therefore, reading by the first RFID tag reader is less likely blocked by the second RFID tag reader, and also, reading by the second RFID tag reader is less likely blocked by the first RFID tag reader. As a result, reading efficiency of the RFID tag can be improved.

The aforementioned control device may be further characterized as follows. That is, in a case in which a continuous transmission time, for which the same unit radio channel can be continuously used after the unit radio channel used for transmission and reception with the second RFID tag has been assigned and the transmission and reception has been started, has elapsed, the radio channel control portion assigns another unit radio channel different from the unit radio channel so far used for transmission and reception. This control device can eliminate a waste of time so far required for reading the RFID tag during a transmission suspension period, thereby further improving reading efficiency of the RFID tag.

In the aforementioned control device, the radio channel control portion may assign another unit radio channel for transmission and reception to the second RFID tag after a continuous transmission time, for which the same unit radio channel can be continuously used after the unit radio channel used for transmission and reception with the second RFID tag has been assigned and the transmission and reception has been started, has elapsed without waiting for a transmission suspension period. This RFID tag reader can eliminate a waste of time so far required for reading the RFID tag during a transmission suspension period, and consequently improve reading efficiency of the RFID tag.

In the above-mentioned control device, the carrier sense control portion may assign unit radio channels for carrier sense to the second RFID tag reader so that the second RFID tag reader performs carrier sense on each of the unit radio channels. This control device can monitor the availability of each of the unit radio channels even while a transmission and reception process is performed. Therefore, the control device can immediately start, continue, and resume the transmission and reception using a unit radio channel, which is monitored as being vacant channel, thereby eliminating a waste of time so far required for reading the RFID tag during a transmission suspension period, and consequently improving reading efficiency of the RFID tag.

In accordance with a third aspect of the present invention, there is provided an RFID tag reading system for capable of reading an RFID tag using a second RFID tag reader (for example, a reader/writer used in a low-output RFID reading system) at least one first unit radio channel (for example, channels 1 to 9) available for a first RFID tag reader (for example, a reader/writer used in a high-output RFID reading system) and at least one second unit radio channel (for example, channels 10 to 14) not available for the first RFID tag reader.

This RFID tag reading system is characterized in that the RFID tag reading system comprises a second RFID tag reader for communicating with an RFID tag using any one of the first unit radio channel and the second unit radio channel, measuring received radiowave strength in each of unit radio channels, and outputting information indicative of the result of measurement (for example, RSSI); and a control device for assigning a unit radio channel used for transmission and reception with an RFID tag to the second RFID tag reader, receiving information indicative of a received radiowave strength (for example, RSSI) in each of unit radio channels measured by the second RFID tag reader, storing information indicative of availability of each of the radio channels (for example, carrier sense result table) based on the information indicative of the received radiowave strength, determining whether any one of the second unit radio channels is available based on the information indicative of availability of each of the unit radio channels, determining whether any one of first unit radio channels is available in a case in which it is determined that any one of the second unit radio channels is not available, and assigning a unit radio channel for transmission and reception to the second RFID tag reader based on the result of the determinations.

In this RFID tag reading system, reading by one of the first RFID tag reader and the second RFID tag reader is less likely blocked due to the unit radio channel being occupied by the other one, in an environment where the first RFID tag reader and the second RFID tag reader are inseparably provided. As a result, reading efficiency of the RFID tag can be improved.

This RFID tag reading system may be further characterized as follows. That is, in a case in which a continuous transmission time, for which the same unit radio channel can be continuously used after the unit radio channel used for transmission and reception with the second RFID tag has been assigned and the transmission and reception has been started, has elapsed, the control device assigns another unit radio channel different from the unit radio channel so far used for transmission and reception.

This RFID tag reading system can eliminate a waste of time so far required for reading the RFID tag during a transmission suspension period, thereby further improving reading efficiency of the RFID tag.

In the aforementioned tag reading system, the control device assigns another unit radio channel for transmission and reception to the second RFID tag reader after the continuous transmission time has elapsed without waiting for a transmission suspension period.

This RFID tag reading system can eliminate a waste of time so far required for reading the RFID tag during a transmission suspension period, thereby further improving reading efficiency of the RFID tag.

Further, in the aforementioned RFID tag reading system, the control device may assign unit radio channels for carrier sense to the second RFID tag reader so that the second RFID tag reader performs carrier sense on each of the unit radio channels.

This RFID tag reading system can monitor the availability of each of the unit radio channels even while a transmission and reception process is performed. Therefore, the RFID tag reading system can immediately start, continue, and resume the transmission and reception using a unit radio channel, which is monitored as being vacant channel, thereby eliminating a waste of time so far required for reading the RFID tag during a transmission suspension period, and consequently improving reading efficiency of the RFID tag.

In accordance with a fourth aspect of the present invention, there is provided an RFID tag reader (for example, a reader/writer used in a low-output RFID tag reading system) for reading an RFID tag capable of using at least one first unit radio channel (channels 1 to 9) available for other RFID tag reader (for example, a reader/writer used in a high-output RFID tag reading system) and at least one second unit radio channel (channels 10 to 14) not available for the other RFID tag reader.

The RFID tag reader comprises: a first oscillation portion (for example, a first variable frequency oscillation unit) for generating a signal with a frequency corresponding to a unit radio channel used for transmission and reception with an RFID tag; a transmission and reception portion (for example, a transmission unit and a reception unit) for carrying out transmission and reception with an RFID tag using a signal generated by the first oscillation portion; a second oscillation portion (for example, a second variable frequency oscillation unit) for generating a signal with a frequency variably corresponding to each of unit radio channels in response to a unit radio channel to be measured for a received radio strength; a carrier sense portion (for example, carrier sense performing unit) for measuring a received radiowave strength on each of unit radio channels using a signal generated by the second oscillation portion; and a control portion (for example, a main control unit) for selecting a next unit radio channel to be used for the transmission and reception portion based on the result of measurement made by the carrier sense portion, and controlling the first oscillation portion to generate a carrier signal with a frequency corresponding to the unit radio channel thus selected, wherein the control portion determines whether any one of the second unit radio channels is available, and determines whether any one of the first unit radio channels is available in a case in which it is determined that any one of the second unit radio channels is not available.

This RFID tag reader can reduce possibility that reading by one of the first RFID tag reader and the second RFID tag reader is blocked due to the unit radio channel being occupied by the other one in an environment where the first RFID tag reader and the second RFID tag reader are inseparably provided. As a result, reading efficiency of the RFID tag can be improved.

According to the present invention, communication congestion and collision can be avoided by effectively assigning a unit radio channel for transmission and reception to RFID tag readers using the same unit radio channel group.

BRIEF DESCRIPTION OF THE DRAWINGS

FIG. 19A is a diagram showing an example of carrier sense performed on a unit radio channel;

FIG. 19B is a diagram showing the change in a value of the availability determination counter corresponding to FIG. 19A;

FIG. 20A is a diagram showing an example of carrier sense performed on a unit radio channel;

FIG. 20B is a diagram showing the change in a value of the availability determination counter corresponding to FIG. 20A;

FIG. 21A is a diagram showing an example of carrier sense performed on a unit radio channel;

FIG. 21B is a diagram showing the change in a value of the availability determination counter corresponding to FIG. 21A;

FIG. 22A is a diagram showing an example of carrier sense performed on a unit radio channel; and FIG. 22B is a diagram showing the change in a value of the availability determination counter corresponding to FIG. 22A.

DETAILED DESCRIPTION OF THE INVENTION

Hereinafter, an embodiment of the present invention is explained with reference to the drawings. First, a basic configuration of an RFID tag reading system according to the present embodiment is described below.

1. RFID Tag Reading System

Figure 1:
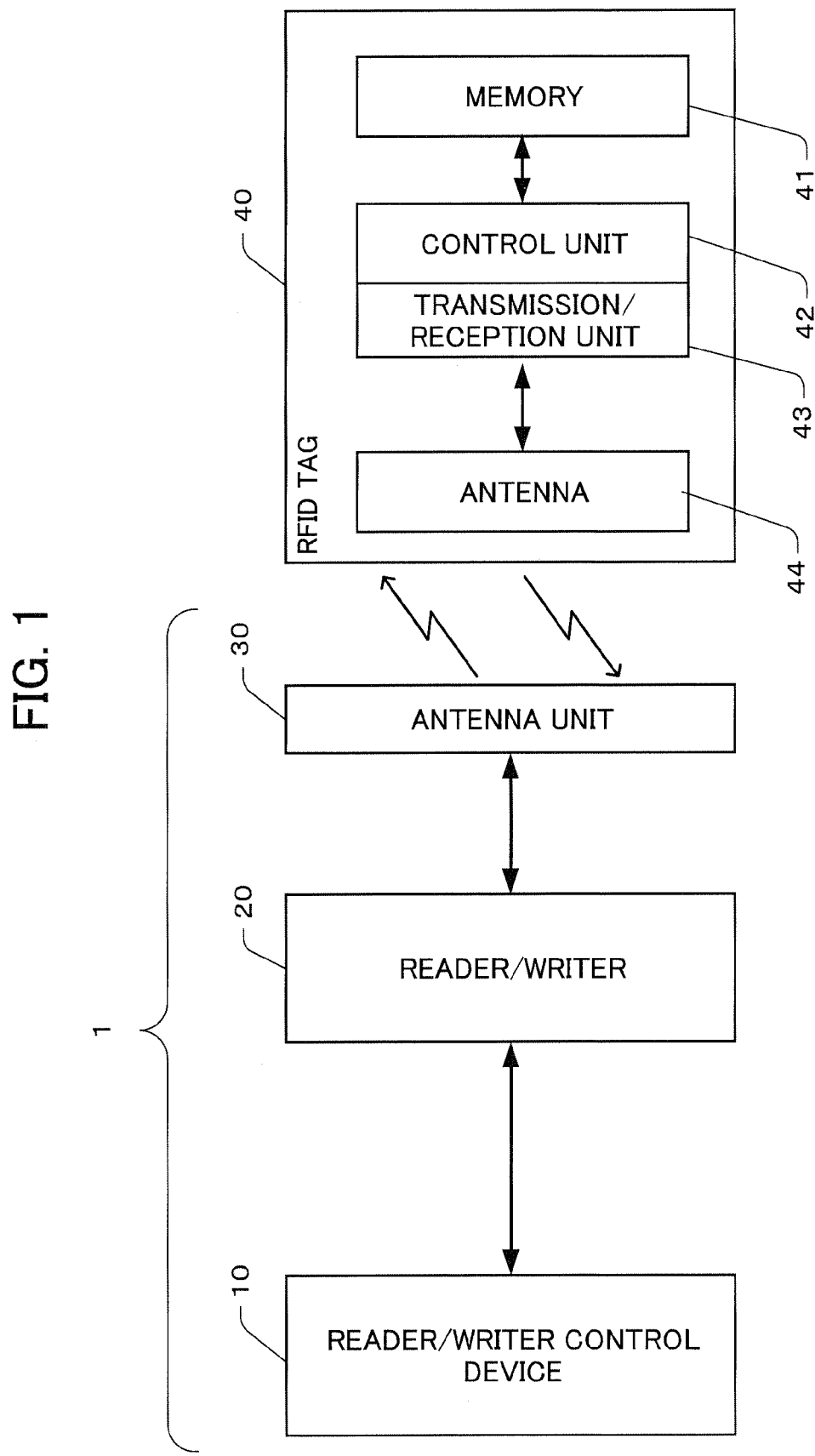
FIG. 1 is a block diagram illustrating a configuration example of an RFID tag reading system.

FIG. 1 is a functional block diagram illustrating an example of a basic configuration of an RFID tag reading system according to the present embodiment of the present invention. It should be noted that a high-output RFID tag reading system and a low-output RFID tag reading system are different in radio transmission output for reading and the amount of unit radio channels available; however, the basic configuration is the same. Hereinafter, a high-output RFID tag reading system and a low-output RFID tag reading system are referred to as RFID tag reading system 1. A configuration example of the RFID tag reading system 1 is described below.

The RFID tag reading system 1 is composed of: a reader/writer control device 10; a reader/writer 20 connected to the reader/writer control device 10; and an antenna unit 30 connected to the reader/writer 20. The components of the RFID tag reading system 1 are described below.

1.1. Reader/Writer control Device

A reader/writer control device 10 controls a reading by a reader/writer 20. In other words, the reader/writer control device 10 controls transmission/reception with an RFID tag 40, transmission time control therefore, determination of vacant channels in accordance with a result of carrier sense (LBT), determination and assignment of a unit radio channel for transmission/reception and the like. Specifically, the reader/writer control device 10 instructs the a reader/writer 20 to execute reading (transmission of a carrier wave and the like to make an RFID tag receive transmission of a modulation wave carrying an inquiry command, transmission of a carrier wave and the like to continue power supply to the RFID tag, and reception of a response from the RFID tag), has a function of instructing the reader/writer 20 to submit data read from the RFID tag 40, storing the data, and executing a predetermined process (for example, generation of a list of unique IDs of the RFID tag 40), determines a unit radio channel for transmission/reception by the reader/writer 20, stores results of carrier sense, determines a channel to use in accordance with the result of carrier sense, and controls transmission time.

Figure 2:
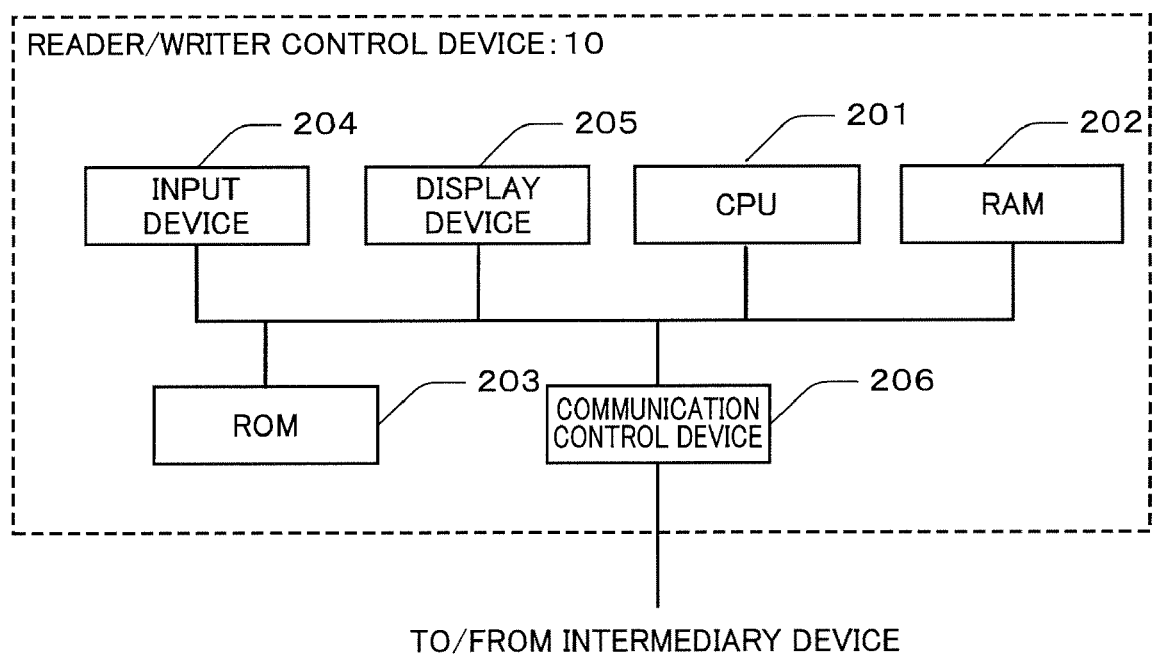
FIG. 2 is a block diagram illustrating an example of a hardware configuration of the reader/writer control device.

The reader/writer control device 10 is an information processing device equipped with an arithmetic processing unit such as a CPU and a storage device such as ROM and RAM. For example, the reader/writer control device 10 can be a computer or various controllers. FIG. 2 is a block diagram illustrating an example of a hardware configuration of the reader/writer control device 10. In the example hardware configuration shown in FIG. 2, the reader/writer control device 10 has a CPU 201, RAM 202 which is a temporary storage portion, ROM 203 which stores programs and fixed data, an input device (e.g., a keyboard and pointing device) which converts a user's input into signals and provides the signals to the CPU 201, a display device 205 (e.g., a liquid crystal displaying device) which displays a processing result of the CPU 201 to a user, and a communication control device 206 (e.g., a LAN board) which communicates with the reader/writer 20.

Figure 3:
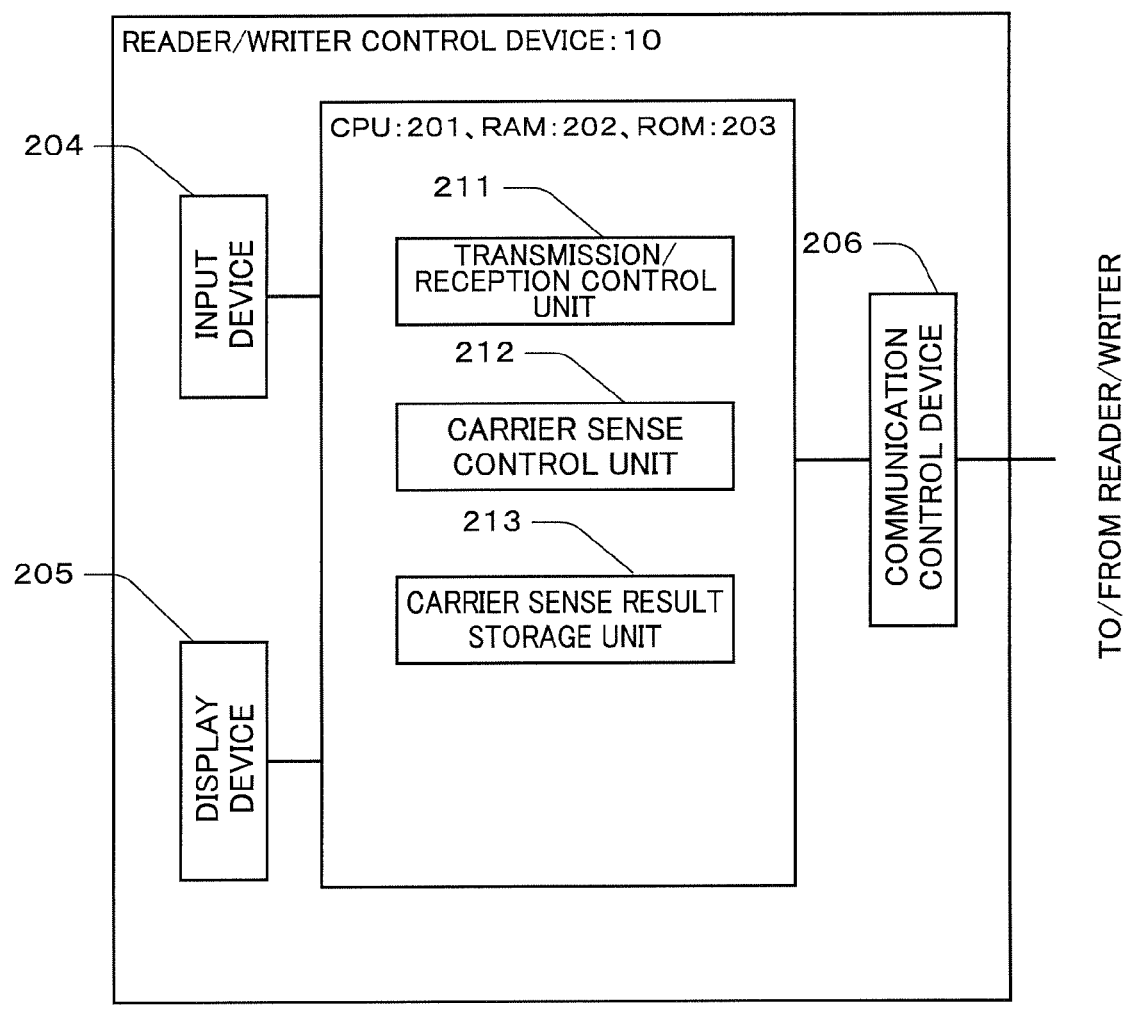
FIG. 3 is a functional block diagram of the reader/writer control device.

FIG. 3 is a functional block diagram of the reader/writer control device 10. The reader/writer control device 10 has a transmission/reception control unit 211, which controls the transmission and reception by the reader/writer 20 and assigns a unit radio channel (in other words, frequency of the carrier wave) that the reader/writer 20 uses for transmission/reception with the RFID tag 40; a carrier sense control unit 212 which receives and stores the carrier sense result from the reader/writer 20 and assigns a unit radio channel (frequency) being the target of carrier sense; and a carrier sense result storage unit 213 which stores the carrier sense result.

Figure 4A:
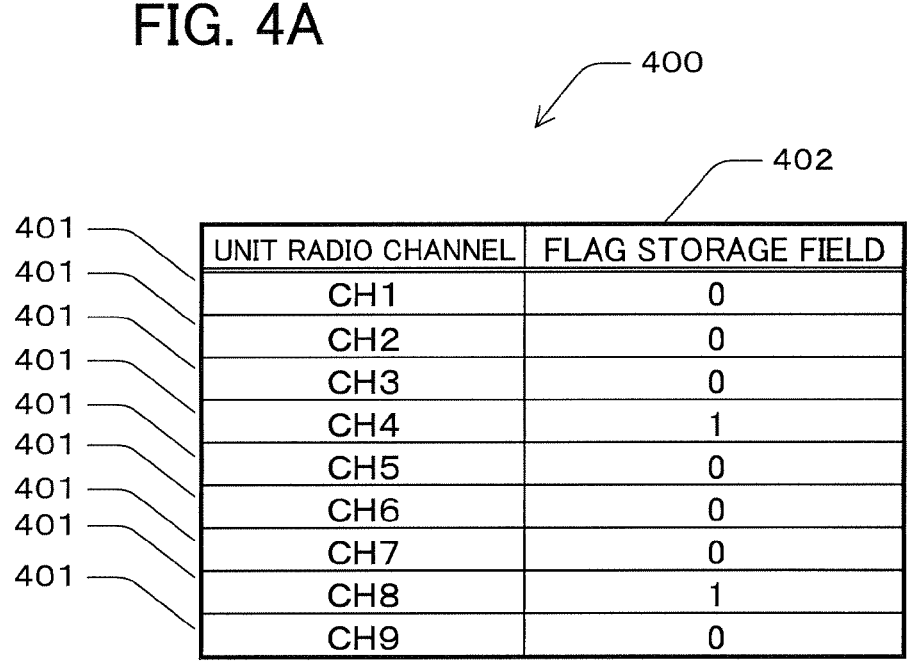
FIG. 4A is a diagram illustrating an example of a high-output carrier sense result table.

FIG. 4 is a diagram illustrating an example of stored contents in the carrier sense result storage unit 213. To the reader/writer 20 used in the high-output RFID tag reading system, 9 available unit radio channels are assigned having a bandwidth of 0.2 MHz each, and a center frequency in the range of 952.2 MHz to 953.8 MHz (hereinafter referred to as the first unit radio channel group). To the reader/writer 20 used in the low-output RFID tag reading system, in addition to the first unit radio channel group, 5 available unit radio channels are also assigned having a bandwidth of 0.2 MHz each, and a center frequency in the range of 954.0 MHz to 954.8 MHz (hereinafter referred to as the second unit radio channel group). FIG. 5 is a diagram showing the channel assignment of the high-output RFID tag reading system and the low-output RFID tag reading system. As shown in FIG. 5, the channels 1 to 9 having a bandwidth of 0.2 MHz and a center frequency in the range of 952.2 MHz to 953.8 MHz are available to both the high-output reader/writer 20 and the low-output reader/writer 20. On the other hand, the channels 10 to 14 having a bandwidth of 0.2 MHz and a center frequency in the range of 954.0 MHz to 954.8 MHz are available only to the low-output reader/writer 20.

The low-output reader/writer 20 uses the channels 10 to 14 prior to the channels 1 to 9. This lowers the occupation frequency of the channels and the frequency of stand-by of the high-output reader/writer 20 for the transmission/reception, and thus the reading efficiency of the whole RFID tag reading system 1 is improved.

The carrier sense result storage unit 213 is described with reference to FIG. 4. FIG. 4A illustrates a data configuration example of a carrier sense result table, which is stored in the carrier sense result storage unit 213 corresponding to the high-output reader/writer 20. In this example, the carrier sense result table 400 has a record 401 for each of the unit radio channels 1 to 9 that are assigned to the reader/writer 20 as an available frequency band. Each record 401 has a flag storage field 402.

Figure 4B:
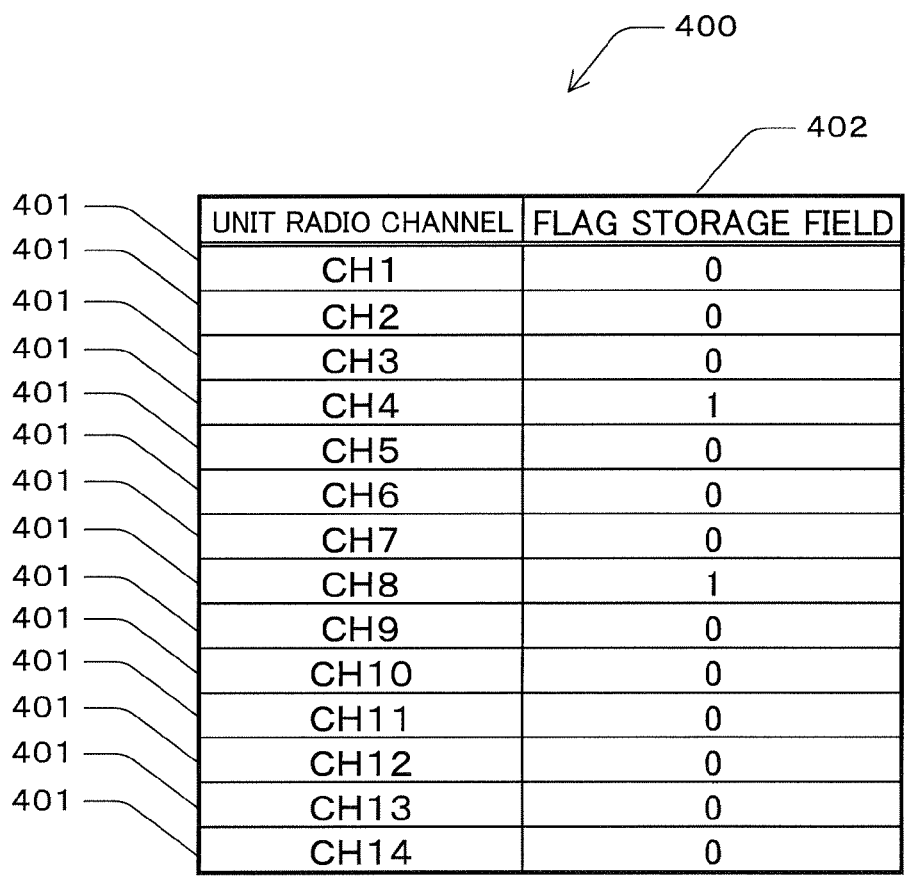
FIG. 4B is a diagram illustrating an example of a low-output carrier sense result table.
Figure 5:
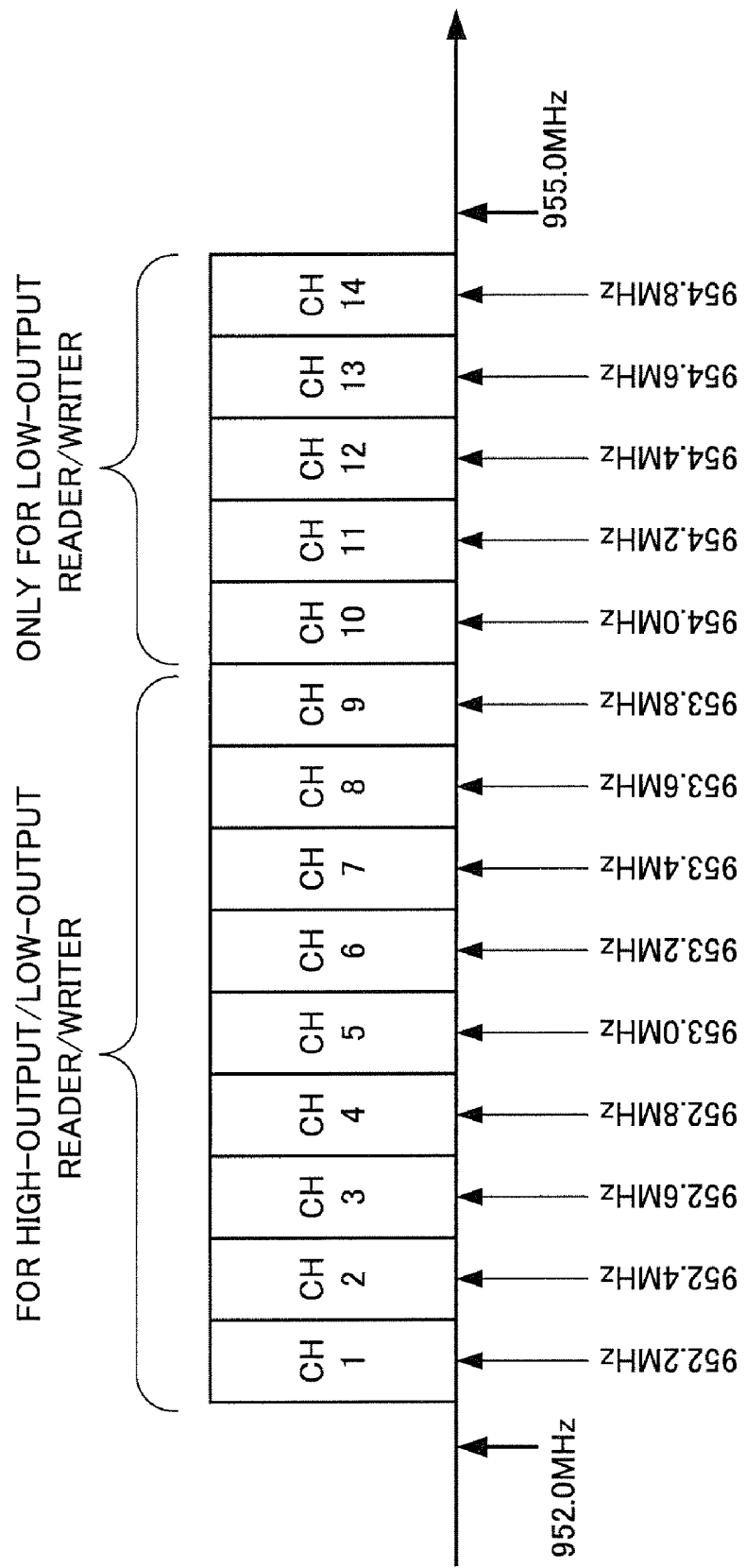
FIG. 5 is a diagram showing the channel assignment of the high-output RFID tag reading system and the low-output RFID tag reading system.

FIG. 4B illustrates a configuration example of a carrier sense result table 400, which is stored in the carrier sense result storage unit 213 corresponding to the low-output reader/writer 20. In this example, the carrier sense result table 400 has a record 401 for each of the unit radio channels 1 to 14 that are assigned to the reader/writer 20 as an available frequency band. Each record 401 has a flag storage field 402.

In the flag storage field 402 in each record 401 of the carrier sense result table 400, information that represents the availability of the corresponding unit radio channel, for example, if an interference power of the corresponding unit radio channel is lower or not higher than a predetermined value, is stored. For example, if a measured result received from the reader/writer 20 shows that an interference power of the corresponding unit radio channel is not higher than a predetermined value (74 dBm for high-output RFID tag reading systems, 64 dBm for low-output RFID tag reading systems), the carrier sense control unit 212 stores 0 in a flag storage field 402 of the corresponding record 401. On the other hand, if a measured result received shows that an interference power of the corresponding unit radio channel is higher than the predetermined value, the carrier sense control unit 212 stores 1 in a flag storage field 402 of the corresponding record 401. The information stored in the flag storage field 402 is the latest carrier sense result for the unit radio channel and refreshed each time carrier sense is performed for the unit radio channel.

Operation of the reader/writer control device 10 and the components 211 to 213 thereof are described later.

1.2. Reader/Writer

The reader/writer 20 is described with reference to FIG. 1. The reader/writer 20 performs transmission/reception with RFID tag 40 by radio, and reads information stored in the RFID tag 40 (for example, unique IDs). Additionally, the reader/writer 20 can use selectively a plurality of available unit radio channels (frequency bands) when performing transmission/reception with the RFID tag 40. For example, in a so-called high-output 950 MHz band passive tag system, the reader/writer 20 can selectively use 9 unit radio channels (channels 1 to 9) that are a frequency band of 952 MHz to 954 MHz assigned for transmission/reception divided by 200 KHz. In a so-called low-output 950 MHz band passive tag system, the reader/writer 20 can selectively use, in addition to the 9 unit radio channels that are a frequency band of 952 MHz to 954 MHz assigned for transmission/reception divided by 200 KHz, 5 unit radio channels (channels 10 to 14) that are a frequency band of 954 MHz to 955 MHz divided by 200 KHz.

The reader/writer 20 continuously performs carrier sense sequentially to each of the plurality of unit radio channels, for a predetermined period of time for each, to monitor the use of the frequency band by other radio stations, such as by another reader/writer. For the reader/writer 20 according to the present embodiment, a carrier sense time for each unit radio channel is determined by a standard and a protocol that the reader/writer 20 must follow. For example, carrier sense is performed for 5 ms for each of the unit radio channels in the high-output 950 MHz band passive tag system, and 10 ms for each of the unit radio channels in the low-output 950 MHz band passive tag system.

The reader/writer 20 continues to perform carrier sense continuously and cyclically, even in a transmission period for reading an RFID tag 40 and in a suspension period after the transmission. Of course, the reader/writer 20 continues to perform carrier sense continuously and cyclically in other periods of time than the transmission period and the suspension period (for example, in a stand-by period).

The reader/writer 20 passes a result of carrier sense (a measured result data, e.g., RSSI) to the reader/writer control device 10. Upon reception of the carrier sense data from the reader/writer 20, the reader/writer control device 10 stores the carrier sense result table 400, which is a data showing the availability of each unit radio channel.

To read an RFID tag 40, the reader/writer 20 chooses a unit radio channel in accordance with the carrier sense result. Transmission/reception of command/data is carried out through the unit radio channel.

The reader/writer 20 performs carrier sense switching between the target unit radio channels sequentially or randomly, and at the same time, performs transmission/reception for reading an RFID tag through the unit radio channel assigned by the reader/writer control device 10, in accordance with an instruction. The transmission/reception can be carried out as long as a continuous transmission time, for which the same unit radio channel can be continuously used after the unit radio channel used for transmission and reception with the second RFID tag has been assigned and the transmission and reception has been started, has not expired. In a case in which it is necessary to continue transmission after that the continuous transmission time has expired, the reader/writer 20 searches for a vacant unit radio channel in accordance with the latest result of carrier sense continuously performed during the continuous transmission time. If any of the unit radio channels is vacant, the reader/writer 20 can promptly start transmission through the vacant unit radio channel without waiting for a transmission suspension period, a carrier sense time, and a back-off time. In selecting the vacant channel, the low-output reader/writer 20 selects and uses from the second unit radio channel group, in other words the channels 10 to 14, prior to the first unit radio channel group, channels 1 to 9.

Figure 6:
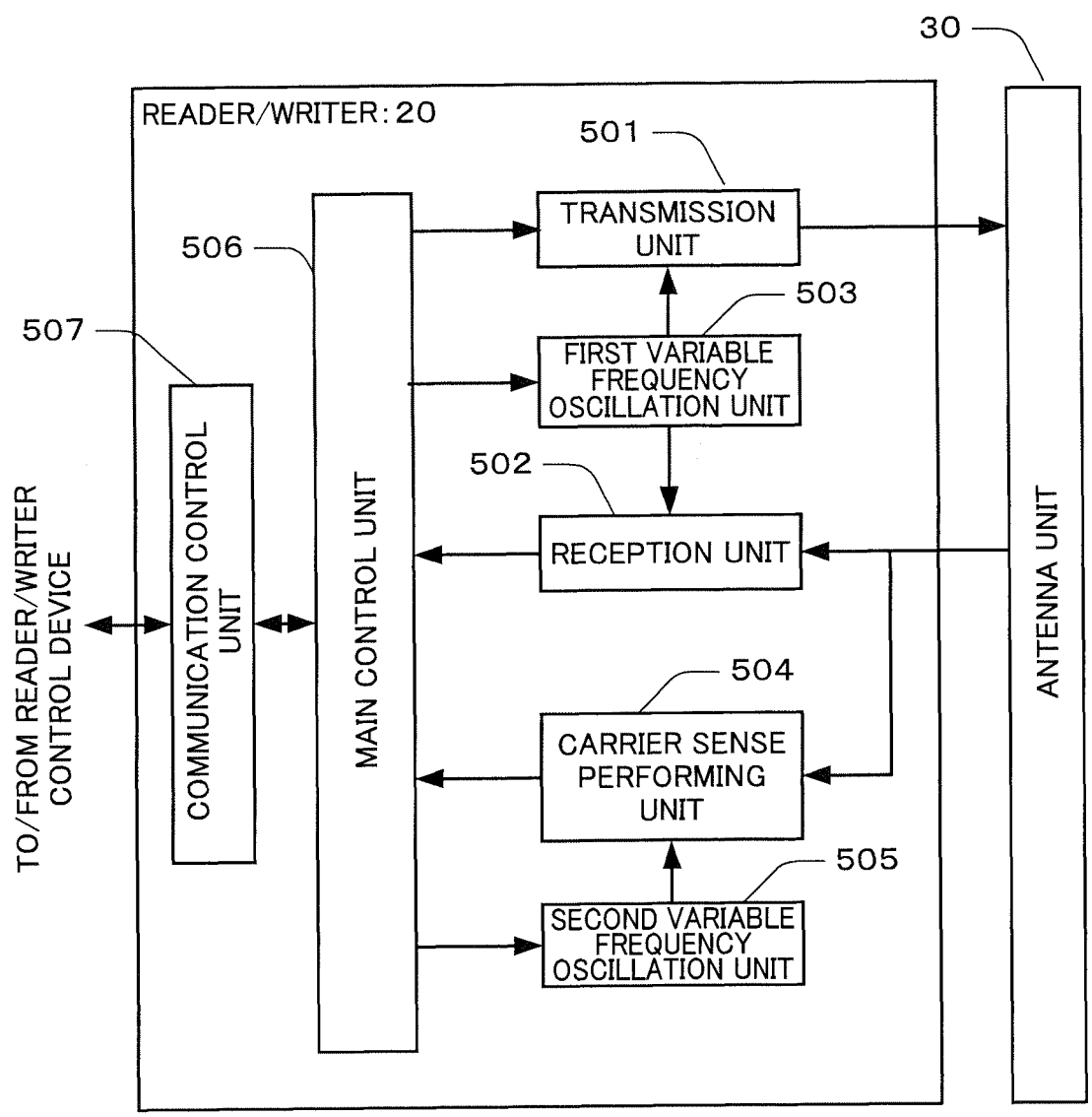
FIG. 6 is a block diagram illustrating a configuration example of the reader/writer.

FIG. 6 is a block diagram illustrating a configuration example of the reader/writer 20. Hereinafter, a configuration example of the reader/writer 20 is described with reference to FIG. 6. It should be noted that a high-output reader/writer 20 and a low-output reader/writer 20 have the same configuration and are referred to as a reader/writer 20 in the following description.

The reader/writer 20 has a transmission unit 501, a reception unit 502, a first variable frequency oscillation unit 503, a carrier sense performing unit 504, a second variable frequency oscillation unit 505, a main control unit 506, and a communication control unit 507.

1.2.1. Transmission Unit

Figure 7:
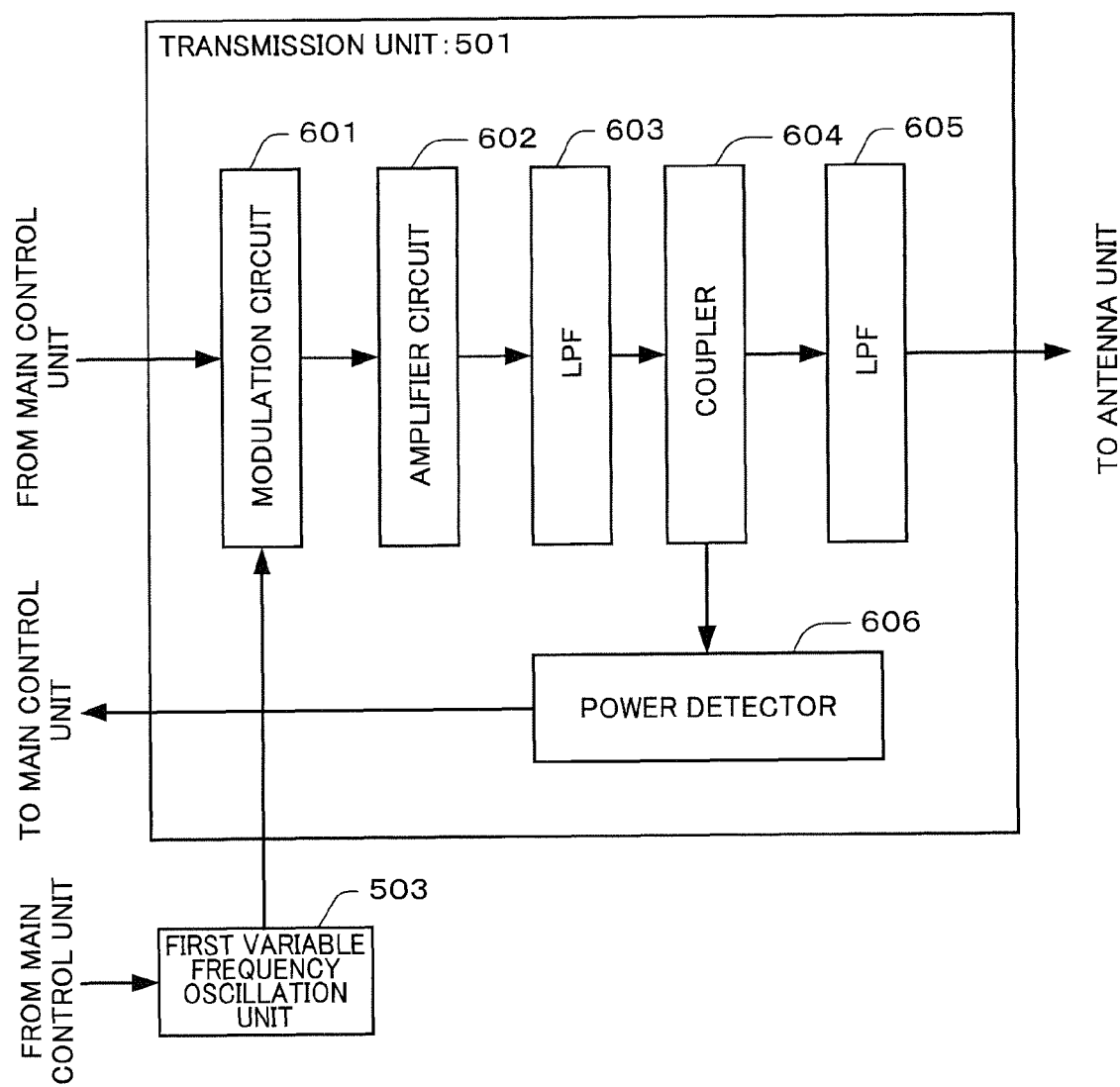
FIG. 7 is a block diagram illustrating an example of a circuit of the transmission unit of the reader/writer.

The transmission unit 501 transmits a carrier wave and a modulation wave by radio to an RFID tag 40 via an antenna unit 30. FIG. 7 is a block diagram illustrating an example of a circuit of the transmission unit 501. Hereinafter, a configuration example of the transmission unit 501 is explained with reference to FIG. 7.

In a configuration example shown in FIG. 7, the transmission unit 501 has a modulation circuit 601, an amplifier circuit 602 connected to an output of the modulation circuit 601, a first low-pass filter 603 connected to an output of the amplifier circuit 602, a coupler 604 connected to an output of the first low-pass filter 603, a second low-pass filter 605 connected to an output of the coupler 604, and a power detector 606 connected to another output of the coupler 604.

The modulation circuit 601 modulates a carrier wave signal, which is output from the first variable frequency oscillation unit 503, using a command and the like which is output from the main control unit 506 as a baseband signal, with a predetermined modulation method (for example, Direct UP Converter method) to output a modulation wave. The amplifier circuit 602 receives the modulation wave from the modulation circuit 601, and amplifies the modulation wave until it can be emitted to the air. The first low-pass filter 603 and the second low-pass filter 605 remove spurious signals contained in the amplified modulation wave. The coupler 604 receives the amplified modulation wave from the first low-pass filter 603 and divides the amplified modulation wave to output to the power detector 606. The power detector 606 receives the divided modulation wave, detects and outputs transmission output power to the main control unit 506. An output of the first variable frequency oscillation unit 503 is connected to the modulation circuit 601. The modulation circuit 601 thus modulates a signal as a carrier wave, which is output from the first variable frequency oscillation unit 503.

1.2.2. Reception Unit

Figure 8:
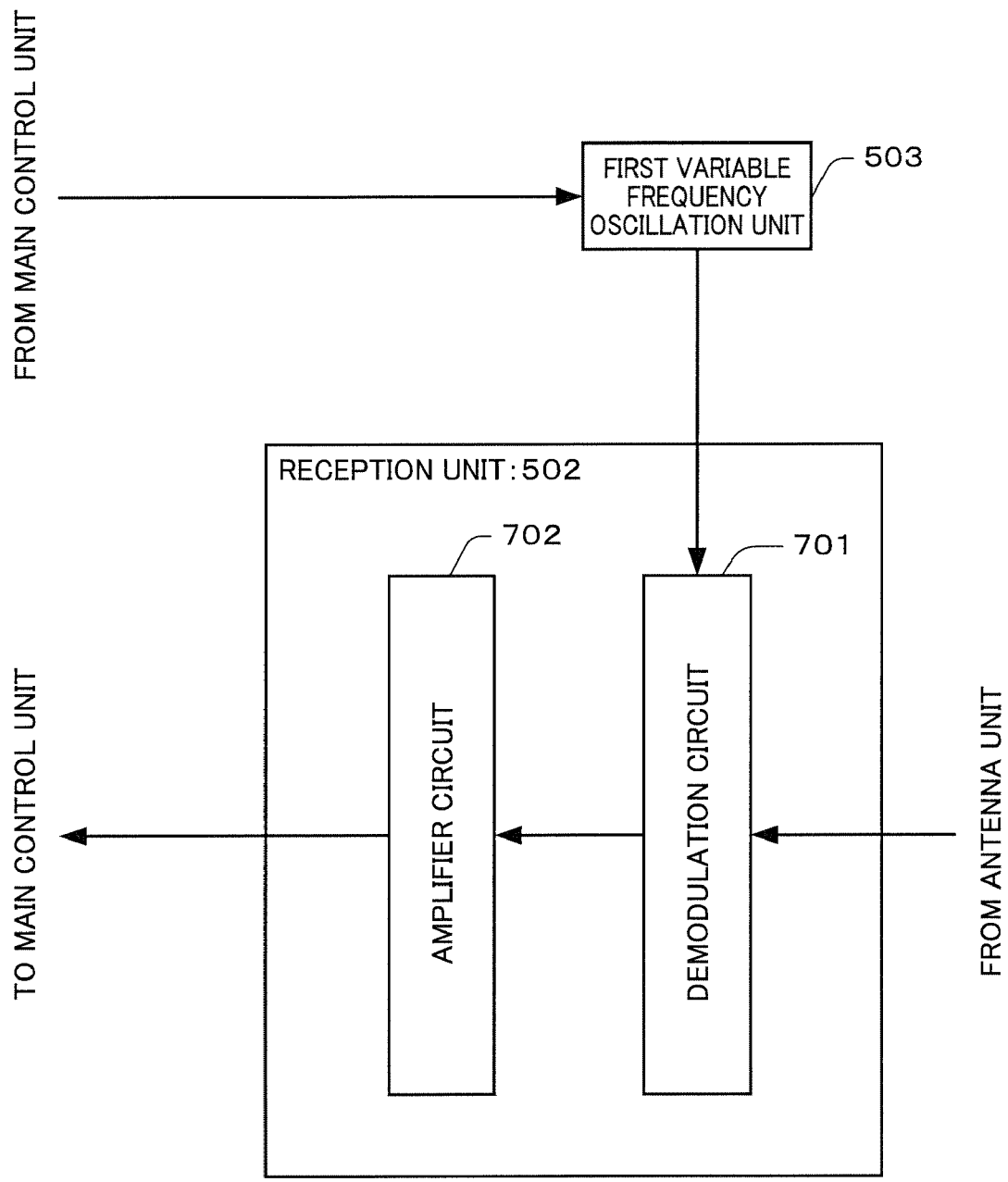
FIG. 8 is a block diagram illustrating an example of a circuit of the reception unit of the reader/writer.

Next, a reception unit 502 is described. FIG. 8 is a block diagram illustrating an example of a circuit of the reception unit 502. The reception unit 502 shown in FIG. 8 has a demodulation circuit 701 and an amplification circuit 702. Radiowaves received by an antenna unit are supplied to the demodulation circuit 701. In addition, an output of the first variable frequency oscillation unit 503 is connected to the demodulation circuit 701. The demodulation circuit 701 receives a response from the RFID tag 40 using the unit radio channel used by the transmission unit 501. The demodulation circuit 701 is constituted of, for example, a demodulator using a direct conversion system.

The amplification circuit 702 amplifies the output of the demodulation circuit 701 to a level at which an analog signal can be converted into a digital signal. The amplification circuit 702 is constituted of, for example, a first differential amplifier connected to an output of the demodulation circuit 701, an active filter connected thereto, and a second differential amplifier connected to an output of the active filter. An output of the amplification circuit 702 is converted into a digital signal via an AD converter (not shown) and is transferred to the main control unit 506.

1.2.3. First Variable Frequency Oscillation Unit

The first variable frequency oscillation unit 503 generates and supplies to the transmission unit 501 and the reception unit 502 a carrier wave signal with a frequency corresponding to the unit radio channel assigned by a reader/writer control device 10. The first variable frequency oscillation unit 503 is a module with, for example, a PLL (Phase Lock Loop) IC and a VCO (Voltage Control Oscillator) IC.

1.2.4. Carrier Sense Performing Unit

Figure 9:
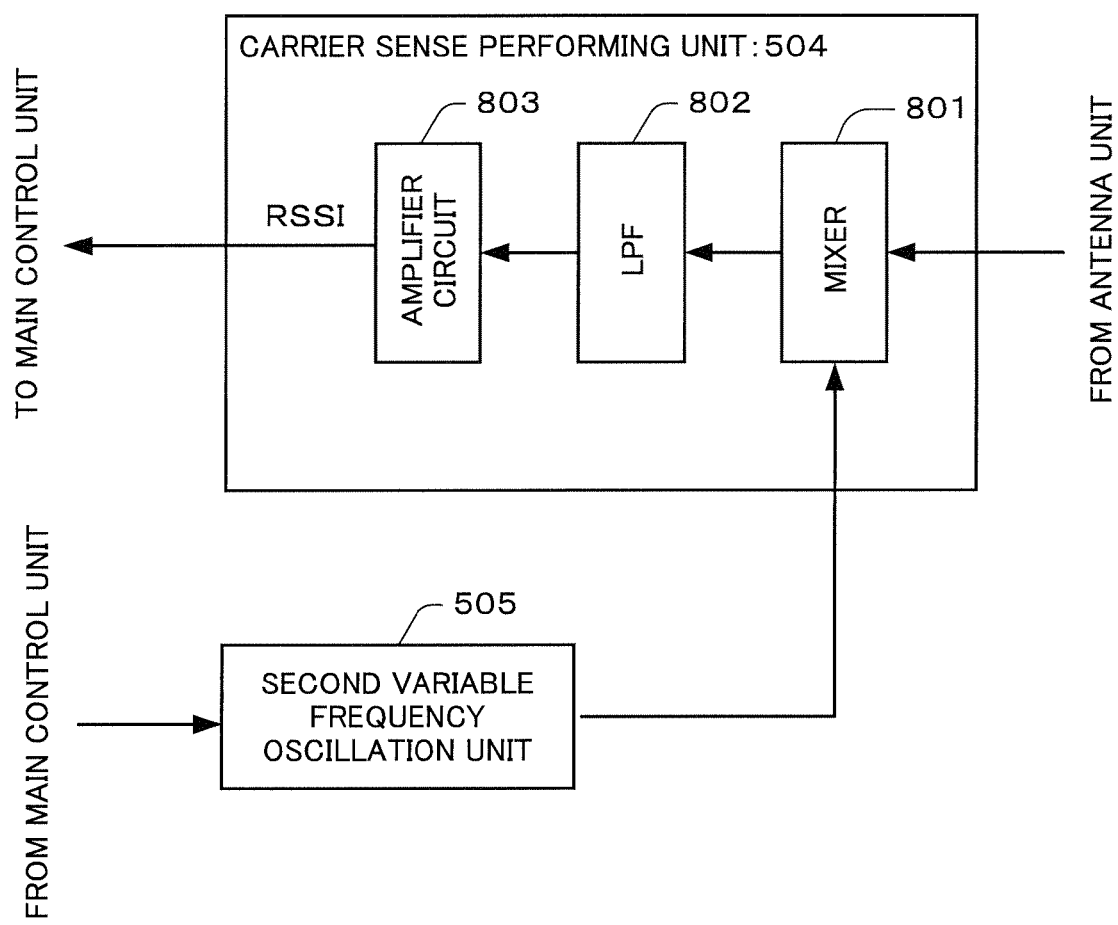
FIG. 9 is a block diagram illustrating an example of a circuit of the carrier sense performing unit of the reader/writer.

The carrier sense performing unit 504 performs carrier sense (interference power measurement) on the unit radio channel assigned by a reader/writer control device 10, and measures and outputs the signal strength of an interference wave in the assigned unit radio channel. FIG. 9 illustrates an example of a circuit of the carrier sense performing unit 504. In a configuration example shown in FIG. 9, the carrier sense performing unit 504 is constituted of: a mixer 801 which mixes a received signal received by the antenna unit 30 and a reference signal (a center frequency of the assigned unit radio channel) which is output from the second variable frequency oscillation unit 505 and outputs an IF signal; a low-pass filter 802, which removes a reference signal (PLL_LO signal) and noise from an output from the mixer 801; and an amplification circuit 803 (e.g., a log amplifier), which amplifies an output from the low-pass filter 802 until the output is convertible to a DC level. The output of the amplification circuit 803 is transferred to the main control unit 506 as an RSSI (Received Signal Strength Indicator).

1.2.5. Second Variable Frequency Oscillation Unit

The second variable frequency oscillation unit 505 generates and supplies to the carrier sense performing unit 504 a reference signal (PLL_LO signal) with a frequency corresponding to the unit radio channel assigned by a reader/writer control device 10. The second variable frequency oscillation unit 505 is a module with, for example, a PLL (Phase Lock Loop) IC and a VCO (Voltage Control Oscillator) IC.

1.2.6. Central Control Unit

The main control unit 506 receives a control instruction from the reader/writer control device 10, interprets the control instruction, makes the transmission unit 501 transmit a modulation wave carrying a non-modulated carrier wave and a command, converts an output from the reception unit 502, which has received a response signal from an RFID tag 40 responding to the modulation wave transmitted, into a data (unique ID), and transfers the data to the reader/writer control device 10. Additionally, the main control unit 506 instructs the frequency of a reference signal separately to the first variable frequency oscillation unit 503 and the second variable frequency oscillation unit 505. The main control unit 506 also receives and transfers an RSSI, which is output from the carrier sense performing unit 504 to the reader/writer control device 10. The reader/writer control device 10 stores the RSSI as a result of the aforementioned carrier sense performed.

1.2.7. Communication Control Unit

The communication control unit 507 is a device for communicating with the reader/writer control device 10 such as a LAN board.

1.3. Antenna Unit

A description of the components of the RFID tag reading system 1 is continued below, again with reference to FIG. 1. The antenna unit 30 emits a carrier wave or a modulation wave to the air and is received from the reader/writer 20, more precisely from the transmission unit 501; emits the carrier wave or the modulation wave to an RFID tag 40; receives a response emitted from the RFID tag 40; and supplies the response to the reader/writer 20, more precisely to the reception unit 502. The antenna unit 30 also supplies a received signal (including an interference wave) to the reader/writer 20, more precisely to the carrier sense performing unit 504.

The antenna unit 30 is constituted of, for example, a transmission antenna, a reception antenna (such as a pole antenna and a patch antenna), and a protective storage case therefor (such as a resin molded case). In the present embodiment, the antenna unit 30 is a separate device from the reader/writer 20. The antenna unit 30 is connected to the reader/writer 20 with a LAN cable and the like. Therefore, the antenna unit 30 can be installed apart from the reader/writer 20.

In another possible embodiment of the present invention, a whole antenna unit 30 or any one of transmission and reception antennas can be incorporated into the reader/writer 20.

The number of antenna units 30 connected to the reader/writer 20 is not limited to one. A plurality of antenna units 30 can be connected to a single reader/writer 20, and the reader/writer 20 can switch between the plurality of antenna units 30 to perform transmission/reception and carrier sense. For example, an antenna unit 30 can be installed in each of the four corners of a closed space such as a warehouse, and the four antenna units 30 can be connected to a single reader/writer 20 via a cable and the like. The reader/writer 20 can switch between the four antenna units 30 and connect to one thereof, to perform transmission/reception, and/or carrier sense from four different directions.

1.4. RFID Tag

Next, an example of general configuration of an RFID tag 40 is described. The RFID tag 40 has a memory 41, a control unit 42, a transmission/reception unit 43, and an antenna 44. The memory 41 is a storage device which stores information that is a reading target, e.g., an identification code for product information and dispatcher information. The control unit 42 interprets commands, requests, instructions and the like from the reader/writer 20, and executes actions corresponding thereto. The transmission/reception unit 43 has a demodulation unit (not shown) and performs modulation and demodulation of signals to communicate with the reader/writer 20. The antenna 44 receives and feeds to the transmission/reception unit 43 a carrier wave from the reader/writer 20, and receives and emits to the air a modulation wave from the transmission/reception unit 43 so that the reader/writer 20 receives the modulation wave. A configuration example of the RFID tag reading system 1 has been described above.

2. Operation Example of RFID Tag Reading System

Next, an operation example of the RFID tag reading system is described.

2.1. Transmission/Reception (Reading) Process

The reader/writer control device 10, in requesting the reader/writer 20 for reading of an RFID tag 40, refers to the carrier sense result table 400 storing the latest carrier sense result, chooses a channel not used by other radio stations including the reader/writer (a vacant channel), and then sends an instruction to the reader/writer 20 to read the RFID tag 40 using the unit radio channel. The reader/writer 20 follows the instruction and reads the RFID tag 40 using the assigned unit radio channel. The reader/writer 20 reads within a predetermined continuous transmission time (e.g., 4 seconds). In a case in which the reading of an RFID tag 40 is not completed in the predetermined continuous transmission time, the reader/writer 20 terminates the transmission/reception through the unit radio channel and queries the reader/writer control device 10 for an available unit radio channel or awaits an instruction from the reader/writer control device 10.

Responding to the query or an instruction request, the reader/writer control device 10 determines if any unit radio channel other than that which had been used by the reader/writer 20 is vacant, by referring to a carrier sense result stored in the carrier sense result storage unit 213. As a result, if any unit radio channel is available, the reader/writer control device 10 instructs the reader/writer 20 to start/resume/continue transmission/reception using the vacant unit radio channel.

It should be noted that the RFID tag reading system 1 according to the present invention switches the unit radio channel at the expiration of the continuous transmission time with the shortest interval time as possible. For example, in a case in which the reader/writer 20 begins reading of an RFID tag using a unit radio channel and then the continuous transmission time expires, the reader/writer 20 promptly resumes the reading of an RFID tag using another unit radio channel (a vacant channel) without waiting for a transmission suspension period, a carrier sense time, and a back-off time.

At the expiration of the continuous transmission time, the conventional reader/writer must halt the transmission/reception at the unit radio channel, i.e. a reading of an RFID tag, for: a predetermined transmission suspension period (for example, 50 ms for high-output reader/writer and 100 ms for low-output reader/writer); a subsequent carrier sense time for determining the availability of the unit radio channel (for example, 50 ms for high-output reader/writer and 100 ms for low-output reader/writer); and a subsequent back-off time (a period for avoiding a collision after the carrier sense time, of which the length is determined randomly after the carrier sense time by random numbers and the like, for example 0 to 5 ms). As a result, in the transmission suspension period, the carrier sense period and the back-off time, the conventional reader/writer cannot read an RFID tag 40 and a reading efficiency per unit time decreases. However, the RFID tag reading system 1 according to the present invention can continue reading an RFID tag 40 without such a waiting time.

Figure 10:
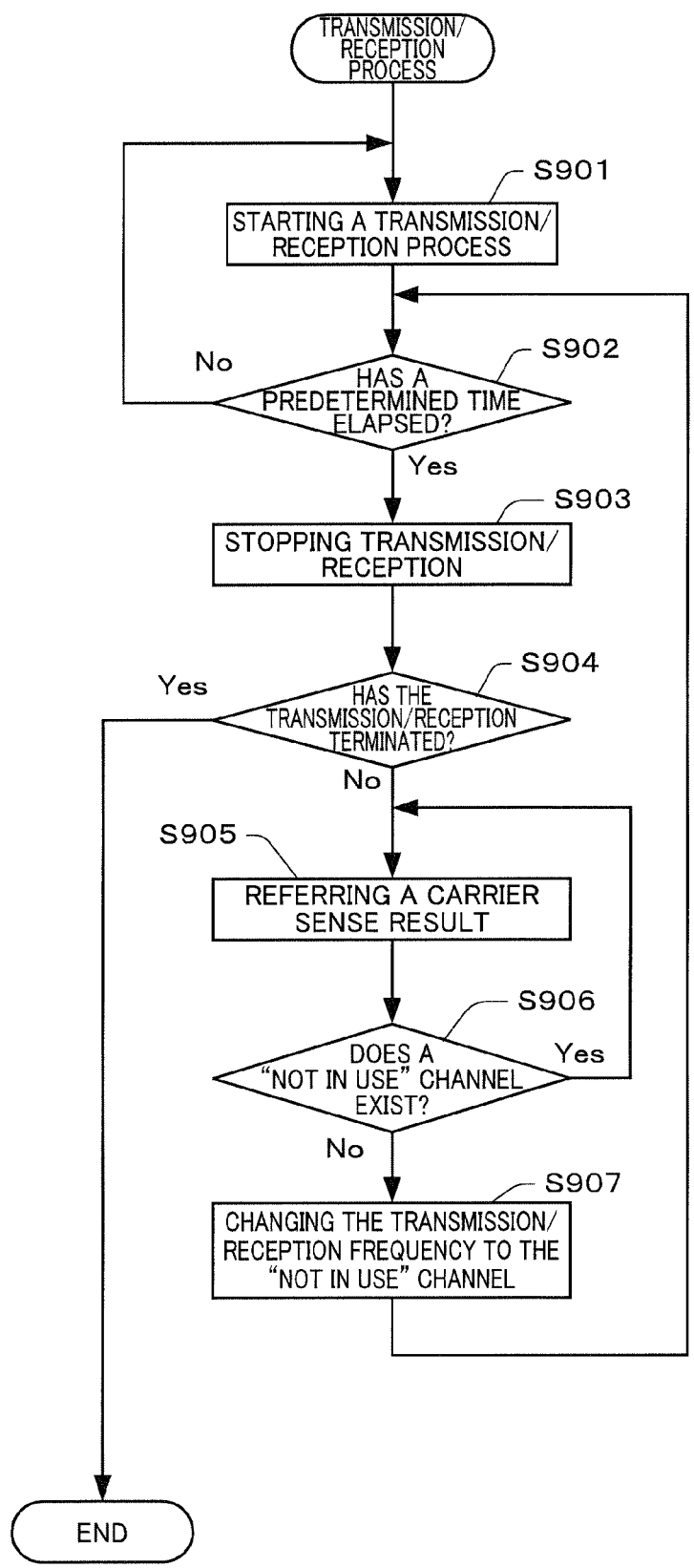
FIG. 10 is a flow chart showing an example of a transmission/reception process by the high-output RFID tag reading system.

FIG. 10 is a flow chart showing an example of a transmission/reception (reading) process by a high-output RFID tag reading system 1 according to the present embodiment. For reading of an RFID tag 40, first, in the high-output RFID tag reading system 1, a reader/writer control device 10 instructs a reader/writer 20 to begin transmission/reception (reading). Here, the reader/writer control device 10 assigns a unit radio channel used for transmission/reception. The unit radio channel is chosen and assigned by the reader/writer control device 10 based on a carrier sense result (specifically, a carrier sense result table 400) obtained from a carrier sense process described later.

Having received the instruction, the reader/writer 20 begins a transmission/reception process using the assigned unit radio channel (S901). In other words, the reader/writer 20 generates a reference wave by a first variable frequency oscillation unit 503 with a frequency corresponding to a center frequency of the unit radio channel assigned by the reader/writer control device 10, and supplies it to a transmission unit 501. The transmission unit 501 generates and supplies to an antenna unit 30 a carrier wave of this frequency band and a modulation wave generated by modulating the carrier wave. Additionally, a response from an RFID tag 40 is demodulated by a reception unit 502 based on the reference wave, and data obtained by the demodulation is transferred to a reader/writer control device 10.

Next, the RFID tag reading system 1 determines whether a continuous transmission time has elapsed since the beginning of the transmission/reception process (S902). The determination can be given by the reader/writer control unit 10 or by a main control unit 506 of the reader/writer 20.

In a case in which it is determined that the continuous transmission time has not expired (S902, No), the RFID tag reading system 1 returns to Step S901 and continues the transmission/reception process. On the other hand, in a case in which it is determined that the continuous transmission time has expired (S902, Yes), the reader/writer 20 halts the transmission/reception process (S903). After the halt of the transmission/reception, the RFID tag reading system 1 determines whether a transmission/reception is terminated in the reading range thereof, i.e. whether the reader/writer 20 has finished reading of a readable RFID tag in a communication range thereof (S904).

In a case in which it is determined that the reader/writer 20 has finished reading (S904, Yes), the RFID tag reading system 1 ends the transmission/reception process. On the other hand, in a case in which it is determined that the reader/writer 20 has not finished reading, i.e. that some RFID tags 40 remain unread (S904, No), the RFID tag reading system 1 refers to a carrier sense result table 400 stored in a carrier sense result storage unit 213 of the reader/writer control unit 10 (S905).

Next, the RFID tag reading system 1, more specifically the reader/writer control device 10, determines whether a vacant channel (unused unit radio channel) is present, based on contents of the carrier sense result table 400 (S906). In a case in which it is determined that no unused unit radio channel is present (S906, No), the RFID tag reading system 1, more specifically the reader/writer control device 10, returns to Step S905 and waits until an unused unit radio channel is stored in the carrier sense result table 400. On the other hand, in a case in which it is determined that an unused unit radio channel is present (S906, Yes), the RFID tag reading system 1, more specifically the reader/writer control device 10, instructs the reader/writer 20 to resume the transmission/reception process using the unused unit radio channel (S907).

Subsequently, the RFID tag reading system 1 returns to Step S901 and resumes the transmission/reception process using the unit radio channel, which is the assigned unused channel.

With the abovementioned transmission/reception process, the RFID tag reading system 1 according to the present invention can continue the transmission/reception process promptly, without waiting for a transmission suspension period, a carrier sense time and a back-off time, even after that the continuous transmission time has expired.

Figure 11:
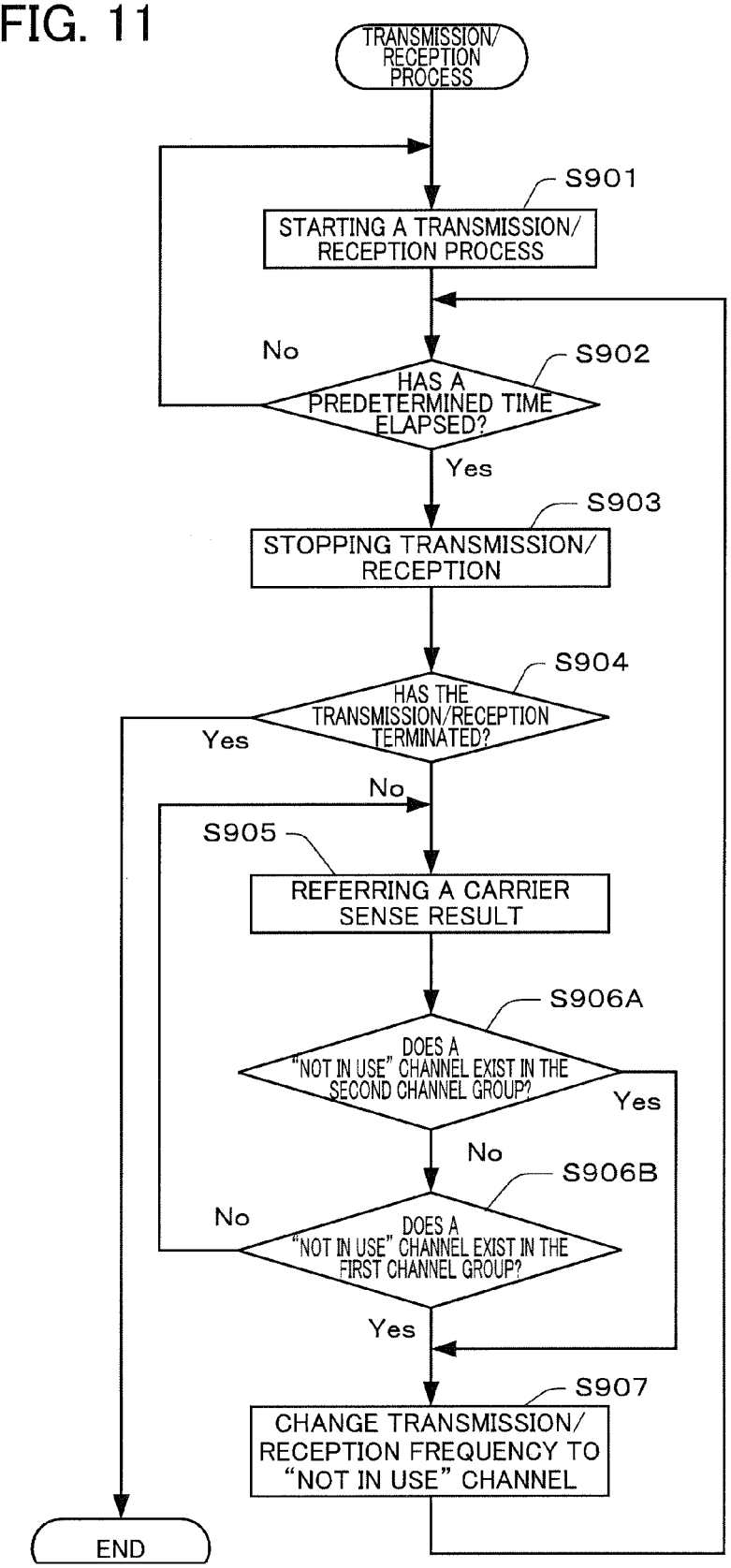
FIG. 11 is a flow chart showing an example of a transmission/reception process by the low-output RFID tag reading system.

FIG. 11 is a flow chart showing an example of a transmission/reception (reading) process by an RFID tag reading system 1, which is a low-output passive tag system according to the present embodiment. A transmission/reception (reading) process by a low-output RFID tag reading system 1 is identical to that by a high-output RFID tag reading system 1 shown in FIG. 10, except for Step S906. The same processes as those of FIG. 10 are designated by the same numerals, and therefore a detailed description is not repeated.

In the transmission/reception (reading) process by a low-output RFID tag reading system, Steps S901 to S905 of FIG. 11, are identical to Steps S901 to S905 of FIG. 10.

Following Step S905, the RFID tag reading system 1 determines whether any channel of the second unit radio channel group (channels 10 to 14) is unused based on the carrier sense result table 400 (S906A). As a result, in a case in which it is determined that any channel of the second unit radio channel group is unused (S906A, Yes), the RFID tag reading system 1, more specifically the reader/writer control device 10, instructs the reader/writer 20 to continue the transmission/reception process using any one of the unused unit radio channels (S907).

On the other hand, in a case in which it is determined that all channels of the second unit radio channel group are in use (S906A, No), the RFID tag reading system 1, more specifically the reader/writer control device 10, determines whether any channel of the first unit radio channel group (channels 1 to 9) is unused based on the carrier sense result table 400 (S906B). In a case in which it is determined that no unused unit radio channel is present in the first unit radio channel group (S906B, No), the RFID tag reading system 1, more specifically the reader/writer control device 10, returns to Step S905 and waits until an unused unit radio channel is stored in the carrier sense result table 400.

On the other hand, in a case in which it is determined that a channel of the first unit radio channel group is unused (S906B, Yes), the RFID tag reading system 1, more specifically the reader/writer control device 10, instructs the reader/writer 20 to continue the transmission/reception process using any one of the unused unit radio channels (S907).

Subsequently, the RFID tag reading system 1 returns to Step S901 and resumes the transmission/reception process using the unit radio channel, which is the assigned unused channel.

With this transmission/reception control method, reading by a high-output reader/writer is less likely blocked due to the first unit radio channel group being occupied by low-output readers/writers, since the second unit radio channel group, which is not used by high-output readers/writers, is assigned preferentially to low-output readers/writers. Additionally, reading by a low-output reader/writer is also less likely blocked by high-output readers/writers, since the second unit radio channel group, which is not used by high-output readers/writers, is assigned preferentially to low-output readers/writers. As a result, the reading efficiency (number of RFID tags read per unit time) of the whole RFID tag reading system can be improved.

2.2. Carrier Sense Process

Next, a carrier sense process according to the present invention is described. The RFID tag reading system 1 is configured to perform carrier sense on unit radio channels continuously and cyclically.

Figure 12:
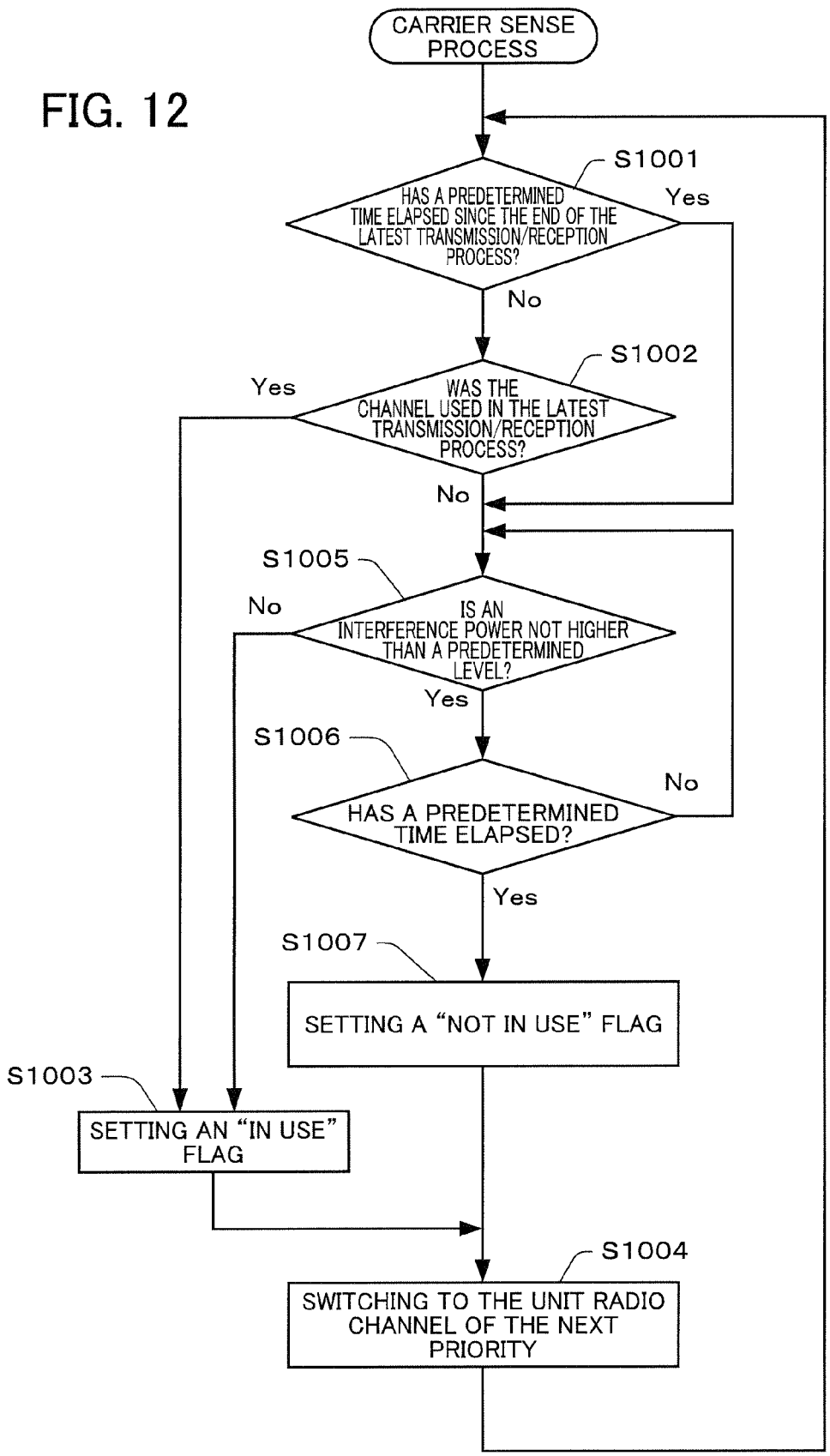
FIG. 12 is a flow chart showing an example of a carrier sense process by an RFID tag reading system.

FIG. 12 is a flow chart showing an example of a carrier sense process by an RFID tag reading system 1 according to the present embodiment. A carrier sense process executed by an RFID tag reading system 1 is described hereinafter with reference to FIG. 12.

First, the RFID tag reading system 1, more specifically a carrier sense control unit 212 of the reader/writer control device 10, determines whether a predetermined period, which corresponds to a transmission suspension period (for example, 50 ms or 100 ms) has elapsed since the end of the latest transmission/reception process (S1001). In a case in which it is determined that a predetermined period has elapsed (S1001, Yes), the RFID tag reading system 1, more specifically the carrier sense control unit 212 of the reader/writer control device 10, proceeds to Step S1005, which is described later. In a case in which it is determined that a predetermined period has not elapsed (S1001, No), the RFID tag reading system 1, more specifically the carrier sense control unit 212 of the reader/writer control device 10, determines whether the unit radio channel being a target of carrier sense is the one used in the latest transmission/reception process executed (S1002). In a case in which it is determined that the unit radio channel being a target of carrier sense is not the one used in the latest transmission/reception process executed (S1002, No), the RFID tag reading system 1, more specifically the carrier sense control unit 212, proceeds to Step S1005 described later.

Contrarily, in a case in which it is determined that the unit radio channel being a target of carrier sense is the one used in the latest transmission/reception process executed (S1002, Yes), the RFID tag reading system 1, more specifically the carrier sense control unit 212 of the reader/writer control device 10, sets a flag indicating "in use" or "not available". More specifically, the carrier sense control unit 212 writes information (a flag) showing "in use" or "not available" in a flag storage field 402 in a record 401 corresponding to the unit radio channel of a carrier sense result table 400 stored in a carrier sense result storage unit 213.

Next, the carrier sense control unit 212 makes a reader/writer 20 change the unit radio channel being a target of carrier sense to the unit radio channel of the next priority, to perform carrier sense on the unit radio channel of the next priority (S1004). Here, the unit radio channel of the next priority is a unit radio channel in the next place of a carrier sense order, which is predetermined for each of the unit radio channels. For example, if the carrier sense order is in ascending order (channels 1 to 9), the unit radio channel of the next priority with respect to channel 1 is channel 2, the unit radio channel of the next priority with respect to channel 2 is channel 3, and so on. It should be noted that the present invention is not limited to the method of assigning the next unit radio channel in accordance with a predetermined carrier sense order. The present invention can be achieved with any method which enables performing a carrier sense evenly to all the unit radio channels, by determining the unit radio channel being the next carrier sense target thereby. For example, random numbers of equal probability can be used to determine the next unit radio channel. Having received a notification of a unit radio channel, the reader/writer 20 returns again to Step S1001 to determine the condition of S1001.

In a case in which it is determined that a predetermined period has not elapsed in Step S1001 (S1001, No), or in which it is determined that the unit radio channel being a target of carrier sense is not the one used in the latest transmission/reception process executed in Step 1002 (S1002, No), the RFID tag reading system 1, more specifically the carrier sense control unit 212 of the reader/writer control device 10, determines whether an interference power of the unit radio channel is not higher than a predetermined level (S1005). More specifically, the carrier sense control unit 212 of the reader/writer control device 10 instructs the reader/writer 20 of a unit radio channel being a target of carrier sense. The main control unit 506 of the reader/writer 20 receives the instruction and instructs a second variable frequency oscillation unit 505 to generate a reference wave with a frequency corresponding to the assigned unit radio channel. The second variable frequency oscillation unit 505 receives the instruction, and generates and outputs to the carrier sense performing unit 504 a reference wave with a frequency corresponding to the assigned unit radio channel. The carrier sense performing unit 504 generates and returns to the main control unit 506 an RSSI corresponding to an interference power of the assigned unit radio channel. The main control unit 506 transfers the RSSI to the reader/writer control device 10, more specifically the carrier sense control unit 212. The carrier sense control unit 212 determines whether an interference power of the unit radio channel is higher than a predetermined level based on the RSSI.

In a case in which it is determined that the interference power is higher than the predetermined level (S1005, No), the RFID tag reading system 1, more specifically the carrier sense control unit 212, sets a flag indicating "in use" or "not available" corresponding to the unit radio channel (S1003). More specifically, the carrier sense control unit 212 writes information (a flag) showing "in use" or "not available" in a flag storage field 402 in a record 401 corresponding to the unit radio channel of a carrier sense result table 400 stored in a carrier sense result storage unit 213.

Next, the carrier sense control unit 212 notifies a reader/writer 20 of the unit radio channel of the next priority to perform carrier sense thereto (S1004). Having received a notification of a unit radio channel, the reader/writer 20 executes Step S1001 again to determine whether a predetermined time has elapsed since the end of the latest transmission/reception process (S1001).

On the other hand, in a case in which it is determined that the interference power is not higher than the predetermined level (S1005, Yes), the RFID tag reading system 1, more specifically the carrier sense control unit 212 of the reader/writer control device 10, determines whether a carrier sense time (for example, 5 ms or 10 ms) has elapsed since the beginning of the carrier sense (S1006). In a case in which it is determined that the carrier sense time has not elapsed (S1006, No), the RFID tag reading system 1, more specifically the carrier sense control unit 212 of the reader/writer control device 10, returns to Step S1005 and determines again whether an interference power of the unit radio channel is higher than a predetermined level (S1005). On the other hand, in a case in which it is determined that the carrier sense time has elapsed (S1006, Yes), the RFID tag reading system 1, more specifically the carrier sense control unit 212, sets a flag indicating "not in use" or "available" corresponding to the unit radio channel (S1007). More specifically, the carrier sense control unit 212 of the reader/writer control device 10 writes information (a flag) showing "not in use" or "available" in a flag storage field 402 in a record 401 corresponding to the unit radio channel of a carrier sense result table 400 stored in a carrier sense result storage unit 213. Thereafter, the RFID tag reading system 1, more specifically the carrier sense control unit 212, proceeds to the abovementioned Step S1004, and begins processing on the next unit radio channel.

With such a carrier sense process, the availability of each unit radio channel can be monitored continuously, and unused (available) channels can be recognized promptly. The carrier sense result is stored in the carrier sense result storage unit 213. The carrier sense control unit 212 can assign a unit radio channel, with which a transmission/reception can be started or resumed promptly, by referring to stored contents of the carrier sense result storage unit 213, without forcing the reader/writer 20 to stop transmission/reception for the transmission suspension period, the carrier sense time, and the back-off time.

2.3. Specific Operation Example of RFID Tag Reading System

Figure 13:
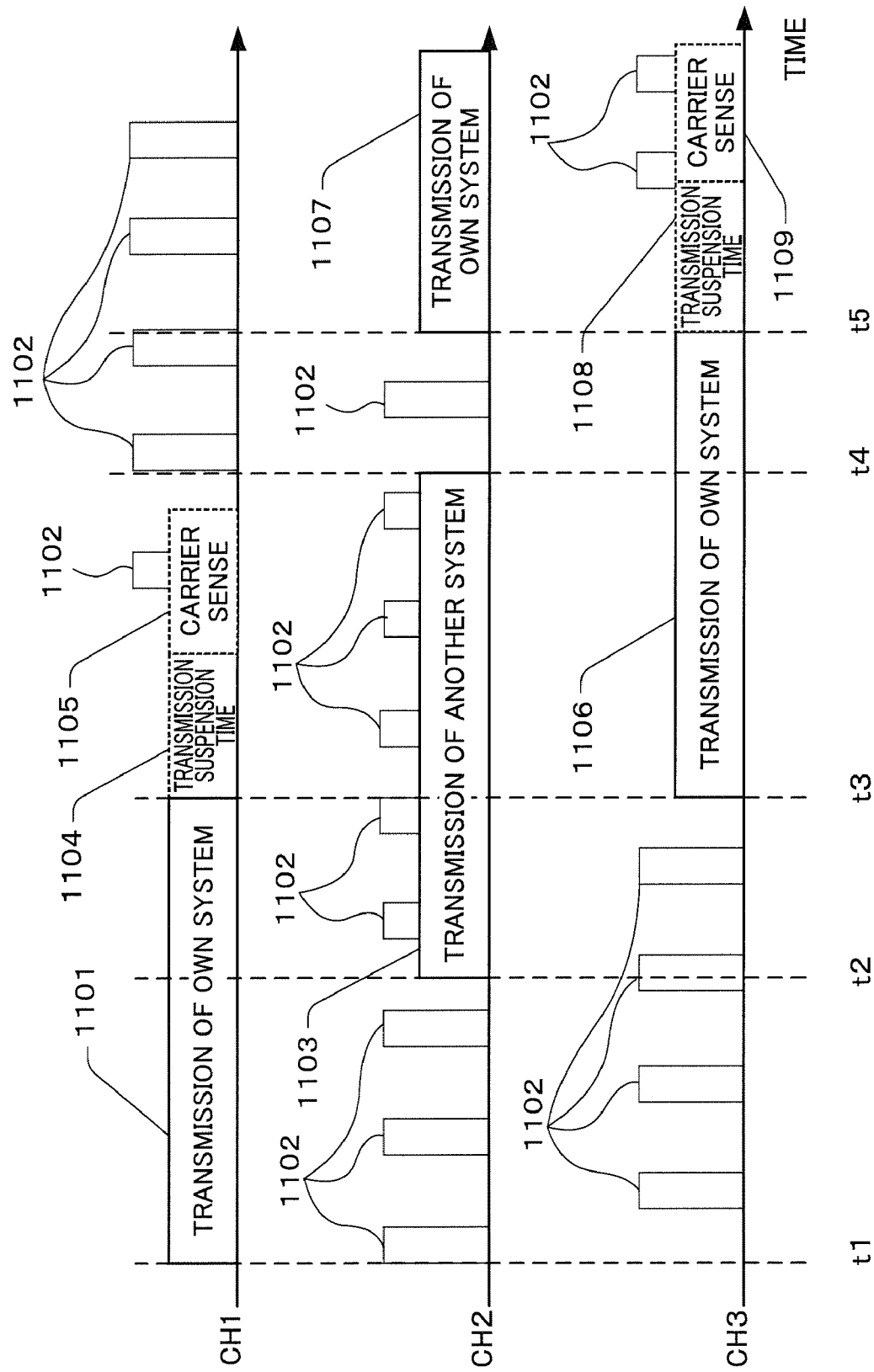
FIG. 13 is a timing diagram showing an operation example of RFID tag reading system.

Finally, a specific operation example of the RFID tag reading system is described. FIG. 13 is a timing diagram showing a specific operation example of RFID tag reading system 1. It should be note that, in an example shown in FIG. 13, all of the unit radio channels assigned are channels 1 to 3, in which the channel 1 belongs to a first unit radio channel group (available to both the low-output and high-output system), and the channels 2 and 3 belong to a second unit radio channel group (available only to the low-output system) for simplification.

In the example shown in FIG. 13, the low-output RFID tag reading system 1 begins a transmission/reception process 1101 at an instant t1, using a unit radio channel 1. In parallel, the RFID tag reading system 1 performs a carrier sense process 1102 on channels 2 and 3. In the carrier sense process 1102 on channels 2 and 3, the carrier sense process is performed continuously and cyclically, i.e. a carrier sense process is performed on channel 2, then on channel 3, then again on channel 2, and so on. The channel 1 is used for the transmission/reception by the RFID tag reading system 1, and thus is not a subject of the carrier sense process.

Subsequently, another radio station begins a transmission 1103 at an instant t2 using the unit radio channel 2. The RFID tag reading system 1 detects that the channel 2 is in use by the carrier sense process 1102 performed on the channel 2, and sets a flag indicating in use in a record 401 of a carrier sense result table 400. For the channel 3, a flag indicating not in use is set in a record 401 for the channel 3.

Next, at an instant t3, the RFID tag reading system 1 assumes that a continuous transmission time for the channel 1 has expired. At the instant t3, another radio station continues the transmission (see 1103 transmission of other system) through the channel 2; however, the channel 3 is still not in use.

Immediately after the instant t3, a flag indicating in use is set in the record 401 for the channel 2, and a flag indicating not in use is set in the record 401 for the channel 3 of the carrier sense result table 400. Regarding the channel 1, since a transmission suspension period is not elapsed since the expiration of the continuous transmission time, a flag "in use" or "not available" is set. The RFID tag reading system 1 refers to the carrier sense result table 400 immediately after the instant t3 and determines that the channel 3 is available. After stopping transmission through the unit radio channel 1, the RFID tag reading system 1 resumes a transmission/reception process 1106 through the channel 3 (see 1106 transmission of the system itself).

In FIG. 13, a transmission suspension period 1104 and a carrier sense time 1105 under the conventional RFID tag reading system are shown on the channel 1 after the instant t3. Under a conventional system, a transmission/reception cannot be resumed until the end of the transmission suspension period 1104 and the carrier sense time 1105. However, under the present RFID tag reading system 1, a transmission/reception can be promptly resumed on the instant t3 (see 1106 transmission of the system itself). On the channel 1, a carrier sense process 1102 is performed cyclically and continuously after a transmission suspension period 1104. On the channel 2, a carrier sense process 1102 is still performed cyclically and continuously. The channel 3 is now used for the transmission/reception process by the RFID tag reading system 1, and thus is not a subject of the cyclic and continuous carrier sense process 1102.

The transmission 1103 by another system stops at an instant t4. The flag is changed to not in use in a record for the channel 1 in the carrier sense result table 400, since the submission suspension time 1104 is expired. The flag not in use is set in a record for the channel 2 since the transmission of another radio station is terminated in the channel 2.

Next, at an instant t5, the RFID tag reading system 1 assumes that a continuous transmission time for the channel 3 has expired and the transmission/reception must be stopped (see 1106 transmission of the system itself). At the instant t5, the channel 1 and the channel 2 are not used by either the RFID tag reading system 1 or the other system, and a flag of not in use is set in the record 401 for both the channel 1 and channel 2 in the carrier sense result table 400. The RFID tag reading system 1 refers to the carrier sense result table 400 immediately after the instant t5, and determines that the channel 1 or channel 2 is available. Here, the unit radio channel 2 belongs to the second unit radio channel group, which is preferably selected, and the channel 1 belongs to the first unit radio channel group, which is subordinated thereto in priority. Therefore, the RFID tag reading system 1 resumes the transmission/reception using the unit radio channel 2 belonging to the preferable second unit radio channel group (see 1107, transmission of the system itself).

In FIG. 13, a transmission suspension period 1108 and a carrier sense time 1109 of channel 3 under the conventional system are shown. Under the conventional system, a transmission/reception cannot be resumed until the end of the transmission suspension period 1108 and the carrier sense time 1109. However, under the present RFID tag reading system 1, a transmission/reception can be promptly resumed on the instant t5 (see 1107 transmission of the system itself). The channel 2 is now used for the transmission/reception process by the RFID tag reading system 1, and thus the cyclic and continuous carrier sense process 1102 performed therefor is stopped. After the instant t5, the carrier sense process 1102 is still performed on the channel 1 cyclically and continuously. On the channel 3, a carrier sense process 1102 is performed cyclically and continuously after a transmission suspension period 1108.

Thus, the present RFID tag reading system 1 can perform the RFID reading process without a transmission suspension period, a carrier sense period and a back-off time, and can improve the RFID tag reading efficiency per unit time.

3. Example

The reader/writer control device 10 and the reader/writer 20 are described more specifically hereinafter as an example of the present invention.

The basic system configuration of the present example is identical to the one described in the embodiment of the present invention, and therefore a description of the configuration of the RFID tag reading system 1 and the components thereof (the reader/writer 20 and the RFID tag 40) is not repeated.

The reader/writer 20 performs carrier sense once in a predetermined period of time (hereinafter referred to as a carrier sense period) on the unit radio channel it uses and repeats the carrier sense period. In the present example, a so-called low-output RFID tag reading system is described; however, a high-output RFID tag reading system can be used instead.

Figure 14:
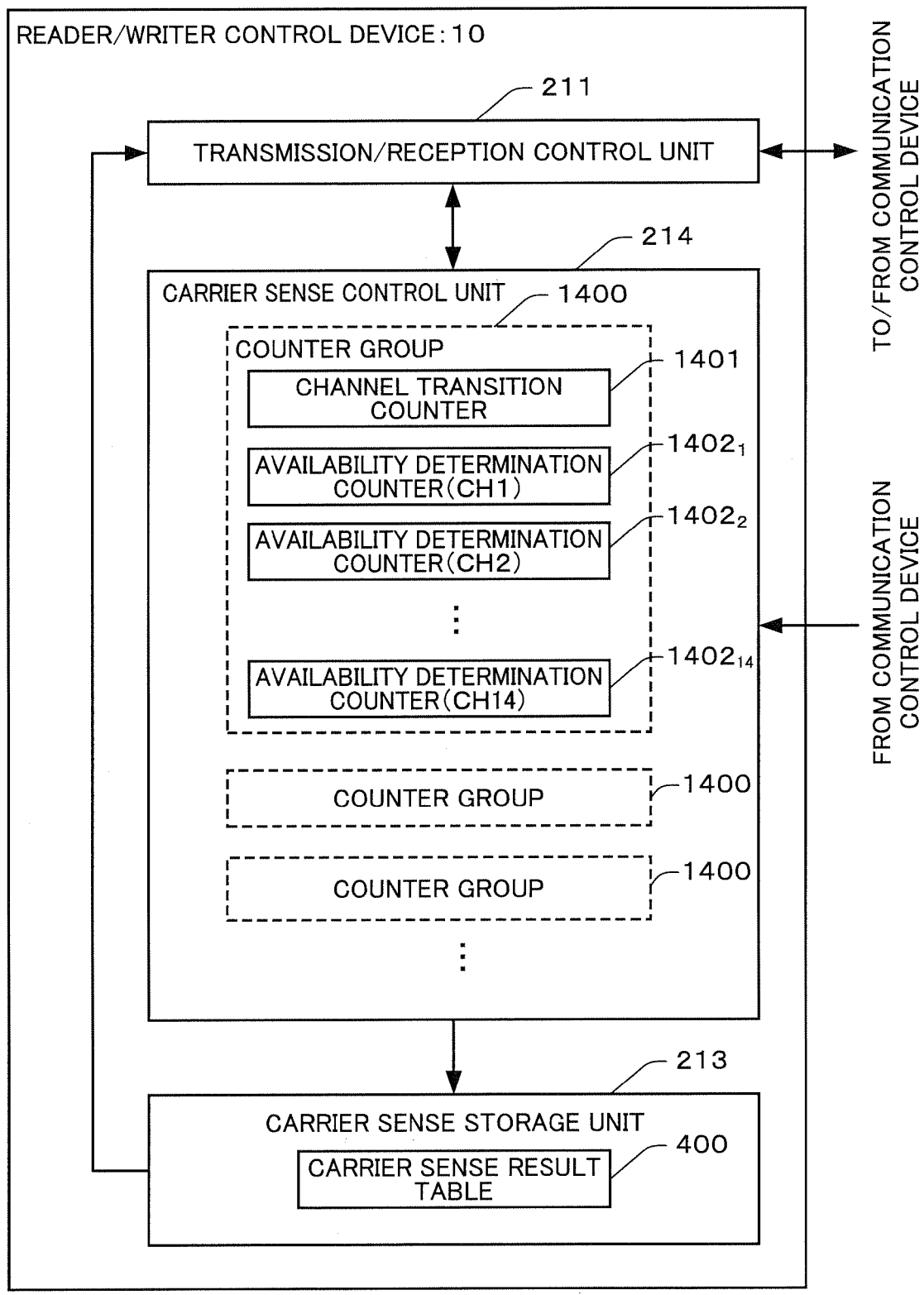
FIG. 14 is a block diagram showing a configuration example of the reader/writer control device.

FIG. 14 is a block diagram illustrating a configuration example of the reader/writer control device 10 according to the present embodiment. As described in the embodiment of the present invention, the reader/writer control device 10 has a transmission/reception control unit 211, a carrier sense control unit 212, and a carrier sense result storage unit 213. In the present example, the carrier sense control unit 212 has a counter group 1400 for each reader/writer 20. Each counter group 1400 has a channel transition counter 1401 and availability determination counters $1402_1, 1402_2, \ldots 1402_{14}$ (branch numbers are added to distinguish channels 1 to 14. An availability determination counter in general is designated with a reference numeral 1402).

A channel transition counter 1401 is a counter for serially switching between unit radio channels being a target of carrier sense determination. An availability determination counter 1402 is a counter for determining the availability of a corresponding channel.

Any counter having a counting feature, for example, a variable in a program of which the value can be incremented and decremented, and a mechanical counter can be used.

Figure 15:
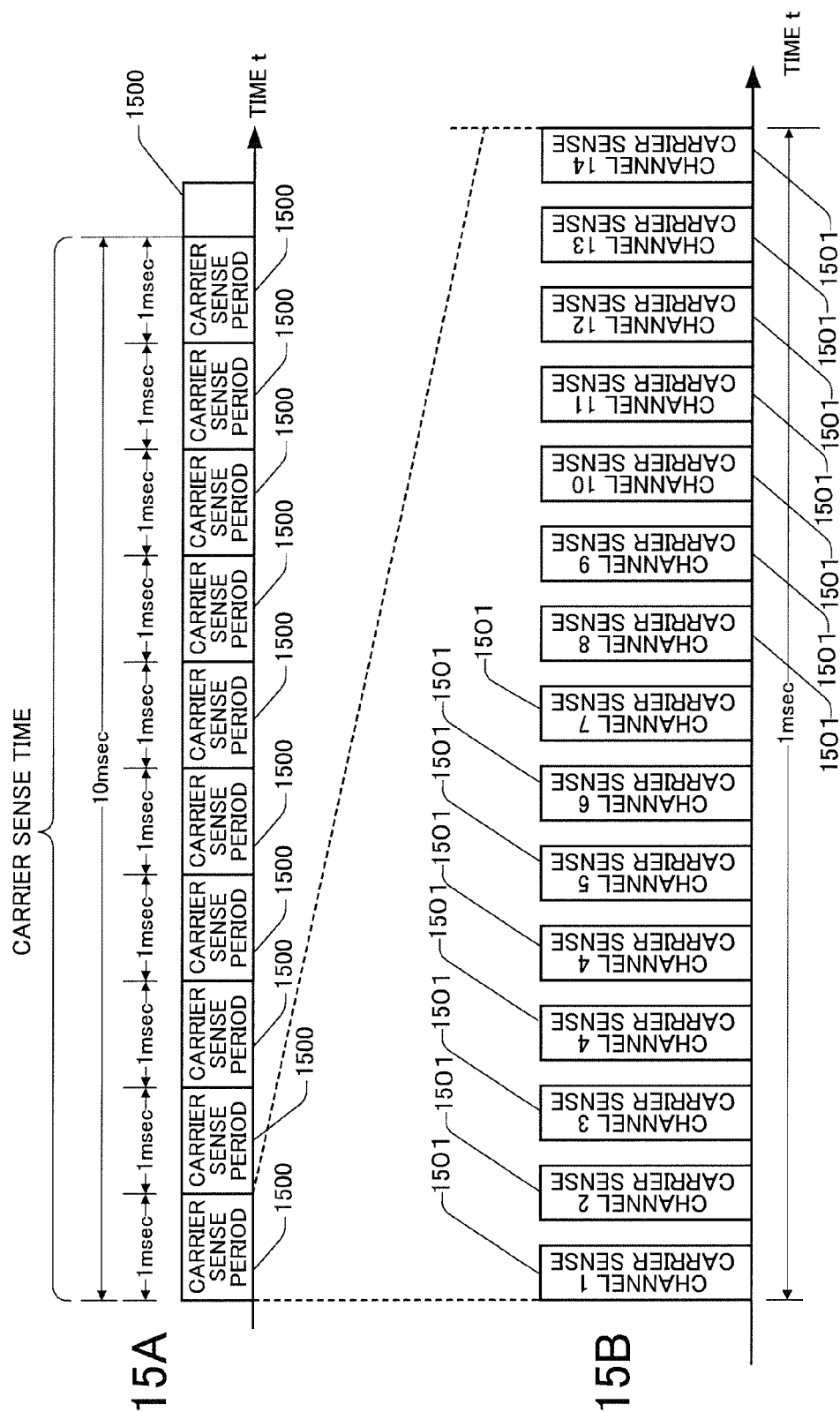
FIG. 15A is a diagram showing repeated carrier sense periods.
FIG. 15B is a diagram showing an example of a carrier sense execution in each carrier sense period.

FIG. 15 is a diagram illustrating an example of a carrier sense performed by the reader/writer of the present example. FIG. 15A shows repeated carrier sense periods 1500. As shown in FIG. 15A, when a carrier sense period 1500 terminates, another carrier sense period 1500 starts.

In this particular example, a carrier sense period 1500 is 1 ms, and 10 consecutive carrier sense periods 1500 make up a carrier sense time of 10 ms as prescribed in the standard. In other words, the carrier sense control unit 212 determines that the unit radio channel is available in a case in which a carrier sense result thereof is not higher than a carrier sense threshold (for example, −64 dBm) in all of the 10 consecutive carrier sense periods 1500. Otherwise, in a case in which a carrier sense result thereof is higher than a carrier sense threshold (for example, −64 dBm) in any one or more of the 10 consecutive carrier sense periods 1500, the carrier sense control unit 212 determines that the unit radio channel is not available (in use by another system).

FIG. 15B is a diagram showing an example of a carrier sense execution in each carrier sense period 1500. In each carrier sense period 1500, the reader/writer 20 executes carrier sense 1501 sequentially to 14 unit radio channels (channels 1 to 14), and transmits or outputs to the reader/writer control device 10 a result of carrier sense 1501 performed on each unit radio channel as an RSSI.

The reader/writer 20 automatically and autonomously switches between the unit radio channels (transition or change of the target unit radio channel) and does not need an instruction of a unit radio channel from the reader/writer control device 10. In other words, the reader/writer 20 continuously and successively outputs to the reader/writer control device 10 an RSSI as a result of carrier sense 1501 for each of all the unit radio channels. The reader/writer 20 can be configured to start/stop/wait/terminate a carrier sense in response to a request, a command and the like, or to perform carrier sense 1501 continuously and successively while being turned on.

Figure 16:
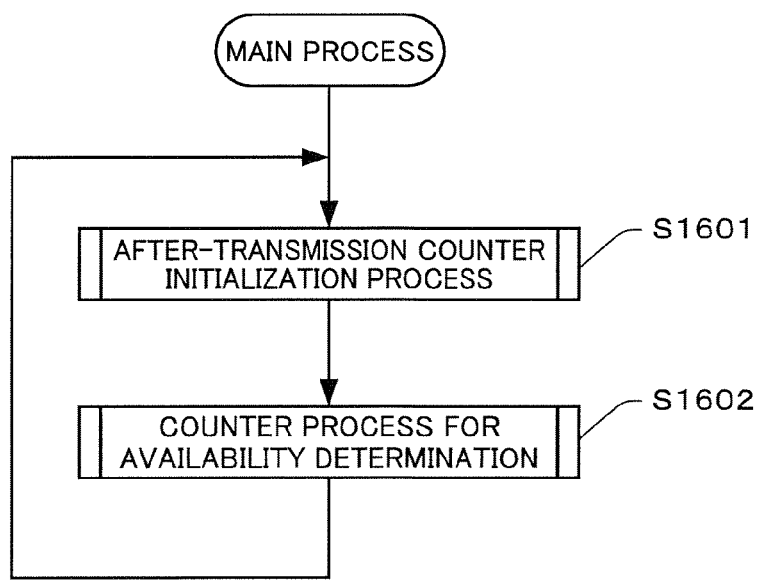
FIG. 16 is a diagram showing an example of a main process executed by the carrier sense control unit.

FIG. 16 is a flow chart showing an example of a main process executed by the carrier sense control unit 212 of the reader/writer control device 10 according to the present embodiment. In the main process, the carrier sense control unit 212 first performs an after-transmission counter initialization process (S1601).

After a reader/writer has terminated a transmission/reception with an RFID tag 40 using a unit radio channel, in the after-transmission counter initialization process, an availability determination counter 1402 corresponding to the unit radio channel is reset to a predetermined initial value (hereinafter referred to as a first initial value).

The first initial value is set as follows: N=M/L in which the first initial value is N, a carrier sense period is L, and a transmission/reception suspension time is M. For example, in a 950 MHz band low-output RFID tag reading system, L (carrier sense period) is 1 ms and M (transmission/reception suspension time) is 100 ms, and thus N is 100; In a 950 MHz band high-output RFID tag reading system, L (carrier sense period) is 1 ms and M (transmission/reception suspension time) is 50 ms, and thus N is 50.

Figure 17:
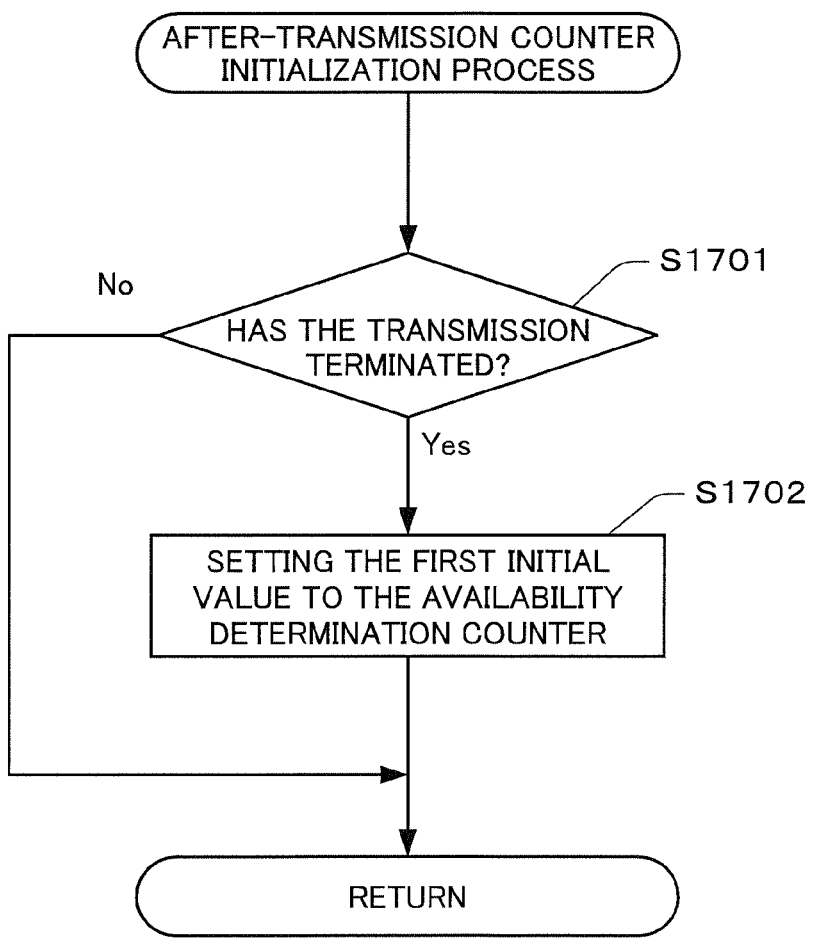
FIG. 17 is a diagram showing an example of an after-transmission counter initialization process executed by the carrier sense control unit.

FIG. 17 is a flow chart showing an example of the after-transmission counter initialization process (S1601). In the after-transmission counter initialization process (S1601), the carrier sense control unit 212 firstly determines whether the transmission of the system itself is terminated on any one of the unit radio channels (S1701). In other words, at the end of a transmission/reception with an RFID tag 40, a transmission/reception control unit 211 of the reader/writer control unit 10 transmits a transmission termination instruction to a reader/writer 20, and passes a transmission termination message (which can also be a command, an instruction and the like) to the carrier sense control unit 212.

In the abovementioned determination of S1701, in a case in which the carrier sense control unit 212 determines that the transmission of the system itself is not terminated, i.e. the transmission termination message has not been received (S1701, No), the carrier sense control unit 212 terminates the after-transmission counter initialization process (S1601) and returns control to the main process.

On the other hand, in a case in which the carrier sense control unit 212 determines that the transmission of the system itself is terminated, i.e. the transmission termination message has been received (S1701, Yes), the carrier sense control unit 212 resets a value of the availability determination counter 1402 corresponding to the unit radio channel, which has terminated the transmission, to the abovementioned first initial value N (S1702). After Step S1702, the carrier sense control unit 212 terminates the after-transmission counter initialization process and returns control to the main process.

The main process is described with reference to FIG. 16. The reader/writer control device 10 executes an availability determination counter process (S1602) after the after-transmission counter initialization process (S1601). In the availability determination counter process (S1602), in accordance with a carrier sense result 1501 for each unit radio channel, a value of a corresponding availability determination counter 1402 is changed. The availability determination counter 1402 has, as stated above, a function of storing, incrementing and decrementing a value. For example, the availability determination counter 1402 may be a predetermined storage area in memory (variable). An availability determination counter 1402 is provided for each unit radio channel. For example, in a low-output RFID tag reading system using 14 unit radio channels (channels 1 to 14), the reader/writer control device 10 provides 14 availability determination counters 1402$_1$ to 1402$_{14}$ for a reader/writer 20.

Figure 18:
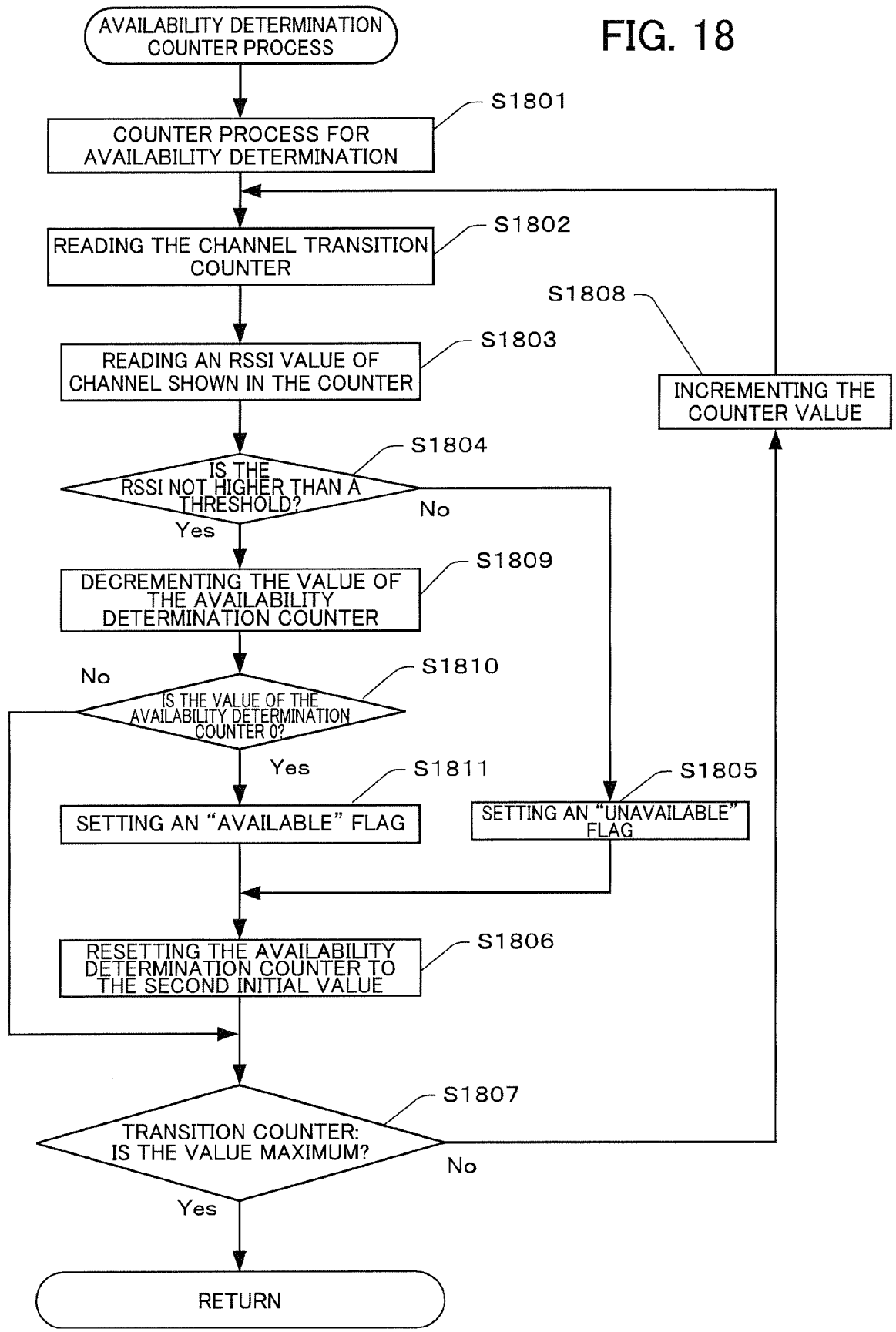
FIG. 18 is a diagram showing an example of an availability determination counter process executed by the carrier sense control unit.

FIG. 18 is a flow chart showing an example of the availability determination counter process (S1602). Hereinafter, a specific example of the availability determination counter process is explained with reference to FIG. 18.

In the beginning of the availability determination counter process, the carrier sense control unit 212 firstly resets a channel transition counter 1401 to 0 (S1801). A channel transition counter 1401 is a counter for serially switching between unit radio channels being a target of carrier sense determination.

Next, the carrier sense control unit 212 reads a value of the channel transition counter 1401 and determines a unit radio channel being a target of carrier sense (S1802).

Next, the carrier sense control unit 212 reads the latest RSSI corresponding to the unit radio channel determined in Step S1802 (S1803). The reader/writer 20 continuously outputs to the reader/writer control device 10 an RSSI as a result of carrier sense for each unit radio channel. Information representing the corresponding unit radio channel (for example, channel number) is appended to each RSSI so that the corresponding unit radio channel can be identified. The reader/writer control device 10 stores the received RSSIs so that the unit radio channels corresponding thereto can be identified and, in Step S1803, refers an RSSI based on the unit radio channel.

Next, the carrier sense control unit 212 determines whether the RSSI read in Step S1803 is not higher than a predetermined threshold (for example, carrier sense level; −64 dBm) (S1804). In a case in which the RSSI is higher than the threshold (S1804, No), the carrier sense control unit 212 sets a "not available" flag for the unit radio channel (S1805). In other words, the carrier sense control unit 212 writes data representing a "not available" flag in a flag storage field 402 in a corresponding record 401 of a carrier sense result table 400 stored in a carrier sense result storage unit 213.

After performing Step S1805, the carrier sense control unit 212 sets the value of the corresponding availability determination counter 1402 to a predetermined value (second initial value) (S1806). The second initial value is set as follows: O=Q/L in which the second initial value is O, a carrier sense period is L, and a carrier sense time is Q; For example, in a 950 MHz band low-output RFID tag reading system, L (carrier sense period) is 1 ms and Q (carrier sense time) is 10 ms, and thus O is 10.

Next, the carrier sense control unit 212 determines whether the counted value of the channel transition counter is the maximum (S1807). Since the maximum counter value indicates that the RSSI determination is done for all the unit radio channels, the carrier sense control unit 212 terminates the availability determination counter process and returns control to the main process (see FIG. 16).

On the other hand, in a case in which it is determined that the RSSI is not higher than the threshold (S104, Yes), the carrier sense control unit 212 decrements the value of the availability determination counter 1402 corresponding to the unit radio channel represented by the value of the channel transition counter 1401 (S1809).

Following Step S1809, the carrier sense control unit 212 determines whether the value of the availability determination counter 1402 is 0 (S1810). The value of the availability determination counter 1402 being 0 indicates that, in all the occurrences (number of occurrences corresponds to the successive second initial value (in this particular example, 5 times)) of the carrier sense period 1501, the interference wave power of the unit radio channel is not higher than a threshold, i.e. that the unit radio channel is vacant and available.

In a case in which it is determined that the value of the availability determination counter 1402 is 0 (S1810, Yes), the carrier sense control unit 212 sets an "available" flag corresponding to the unit radio channel (S1811). In other words, the carrier sense control unit 212 writes data representing an "available" flag in a flag storage field 402 in a corresponding record 401 of a carrier sense result table 400 stored in a carrier sense result storage unit 213.

After Step S1811, the carrier sense control unit 212 sets the value of the availability determination counter 1402 to the abovementioned second initial value (S1806).

Next, the carrier sense control unit 212 performs the determination of the counted value of the channel transition counter 1401. The process following Step S1807 is similar to the foregoing description, and thus a detailed description is not repeated.

On the other hand, in a case in which the carrier sense control unit 212 determines that the value of the availability determination counter 1402 is not 0 (S1810, No), Step S1807 is immediately processed. In this case, Steps S1811 and S1606 are not processed and the value of the availability determination counter 1402 is decremented. A flag storage field 402 in a corresponding record 401 of a carrier sense result table 400 stored in a carrier sense result storage unit 213 is not changed. The availability determination counter process has been described above.

The main process is described with reference to FIG. 16. After the availability determination counter process (S1602), the carrier sense control unit 212 returns to the after-transmission counter initialization process (S1601), and then executes the after-transmission counter initialization process (S1601) and the availability determination counter process (S1602) repeatedly. In this main process, the value of the availability determination counter 1402 is controlled so that a "not available" flag is set within the transmission suspension period, and the carrier sense result for each of the unit radio channels in the carrier sense period 1501 is reflected to the value of the availability determination counter 1402. The main process has been described above.

Next, the change in a value of the availability determination counter is described. FIGS. 19 to 22 are timing diagrams showing examples of the change in a value of the availability determination counter 1402 corresponding to a unit radio channel.

When Setting an "Available" Flag

FIG. 19 is a diagram showing an example of the change in a value of the availability determination counter 1402 in a case in which the carrier sense result for the unit radio channel is not higher than a threshold in all the successive carrier sense periods $1501_1$ through $1501_{10}$, i.e. in a case in which the unit radio channel is vacant. FIG. 19A is a timing diagram showing executions of carrier sense $1501_1$ to $1501_{11}$. In this particular example, carrier sense $1501_1$ to $1501_{11}$ are executed on the unit radio channel at instants t0 to t10 (every 1 ms). It should be noted that although omitted in FIG. 19, carrier sense 1501 is performed also on other unit radio channels.

FIG. 19B is a diagram showing the change in a value of the availability determination counter 1402 corresponding to the unit radio channel shown in FIG. 19A. Before the instant t0, the counter value for the unit radio channel was 0.

At the instant t0, the value of the availability determination counter 1402 is set to the second initial value (see FIG. 18, S1806). Therefore, immediately after the instant t0 of FIG. 19B, the value of the availability determination counter 1402 is the second initial value (10).

Subsequently, the carrier sense control unit 212 receives a result of the first carrier sense $1501_1$. In this illustrated example, since the result of carrier sense $1501_1$ is not higher than the threshold, the carrier sense control unit 212 decrements the value of the availability determination counter 1402 (see FIG. 18, S1809). Thus, the value is 10−1=9. The carrier sense control unit 212 determines that the value of the availability determination counter 1402 is not 0 (see FIG. 18, S1810), and does not set the value of the availability determination counter to the second initial value.

Subsequently, the second carrier sense period 1500 starts at the instant t1, and the second carrier sense $1501_2$ is performed on the unit radio channel. The carrier sense control unit 212 receives a result of the second carrier sense $1501_2$ from the reader/writer 20. In this illustrated example, since the result of carrier sense $1501_2$ is not higher than the threshold, the carrier sense control unit 212 decrements the value of the availability determination counter 1402. Thus, the value is 9−1=8.

Similarly, the third to the tenth carrier sense periods 1500 start at the instants t2 to t9 (the fourth to eighth carrier sense executions are not shown). In the third to the tenth carrier sense periods 1500, the reader/writer 20 executes the third to the tenth carrier sense $1501_3$ to $1501_{10}$ on the unit radio channel, and outputs to the reader/writer control device 10 results of carrier sense $1501_3$ to $1501_{10}$.

The carrier sense control unit 212 of the reader/writer control device 10 receives results of the third to the tenth carrier sense $1501_3$ to $1501_{10}$ from the reader/writer 20. In this illustrated example, since all the results of carrier sense $1501_3$ to $1501_{10}$ are not higher than the threshold, the carrier sense control unit 212 decrements, for each of the carrier sense $1501_3$ to $1501_{10}$, the value of the availability determination counter 1402. After decrementing in accordance with the result of the tenth carrier sense $1501_{10}$ after the instant t9, the value of the availability determination counter 1402 is 0. After decrementing for each of the carrier sense $1501_3$ to $1501_{10}$, the carrier sense control unit 212 determines whether the value of the availability determination counter 1402 is 0 (see FIG. 18, S1810). In this particular example, since the value of the availability determination counter 1402 is 0, the carrier sense control unit 212 sets an "available" flag in a carrier sense result table 400 as a result of a determination (see FIG. 18, S1811).

When Setting a "Not Available" Flag

Next, the change in the value of the availability determination counter 1402 for setting a "not available" flag is described. FIG. 20 describes a case in which, as a result of carrier sense $1501_{21}$ to $1501_{30}$ performed on a unit radio channel in 10 successive carrier sense periods, the result of the third carrier sense $1501_{23}$ exceeds a threshold and the results of the other carrier sense $1501_{21}$, $1501_{22}$ and $1501_{24}$ to $1501_{30}$ are not higher than the threshold.

FIG. 20A is, like FIG. 19A, a timing diagram showing executions of carrier sense 1501 on a unit radio channel. In this particular example, carrier sense $1501_{21}$ to $1501_{31}$ are executed on the unit radio channel at instants t20 to t30 (every 1 ms). It should be noted that, although omitted in FIG. 20, carrier sense 1501 is performed also on other unit radio channels.

FIG. 20B is a diagram showing the change in a value of the availability determination counter 1402 corresponding to the unit radio channel shown in FIG. 20A. Before the instant t20, the counter value for the unit radio channel was decremented (see FIG. 18, S1809) to 0.

At the instant t20, the value of the availability determination counter 1402 is set to the second initial value (see FIG. 18, S1806). Therefore, in FIG. 20B, the value of the availability determination counter 1402 is the second initial value (10). Subsequently, the carrier sense control unit 212 receives a result of the first carrier sense $1501_{21}$. In this illustrated example, since the result of carrier sense $1501_{21}$ is not higher than the threshold, the carrier sense control unit 212 decrements the value of the availability determination counter 1402 (see FIG. 18, S1809). Thus, the value is 10−1=9. Subsequently, the carrier sense control unit 212 determines that the value of the availability determination counter 1402 is not 0 (see FIG. 18, S1810).

Subsequently, the second carrier sense period 1500 starts at the instant t21. The second carrier sense $1501_{22}$ is performed on the unit radio channel in this period. The carrier sense control unit 212 receives a result of the second carrier sense $1501_{22}$ from the reader/writer 20. In this illustrated example, since the result of carrier sense $1501_{22}$ is not higher than the threshold, the carrier sense control unit 212 decrements the value of the availability determination counter 1402. Thus, the value is 9−1=8.

Subsequently, the third carrier sense period 1500 starts at the instant t22. The third carrier sense $1501_{23}$ is performed on the unit radio channel in this period. The carrier sense control unit 212 receives a result of the third carrier sense $1501_{23}$ from the reader/writer 20. In this illustrated example, since the result of the third carrier sense $1501_{23}$ exceeds the threshold, the carrier sense control unit 212 sets a "not available" flag in the carrier sense result table 400 (see FIG. 18, S1805), and then resets the value of the availability determination counter to the second initial value (in this example, 10) (see FIG. 18. S1806).

Subsequently, the fourth to the tenth carrier sense periods 1500 start at the instants t23 (not shown) to t29. In the fourth to the tenth carrier sense periods 1500, the reader/writer 20 executes the fourth to the tenth carrier sense $1501_{24}$ (not shown) to $1501_{30}$ on the unit radio channel, and outputs to the reader/writer control device 10 results of carrier sense $1501_{24}$ (not shown) to $1501_{30}$.

The carrier sense control unit 212 of the reader/writer control device 10 receives results of the fourth to the tenth carrier sense $1501_{23}$ to $1501_{30}$ from the reader/writer 20. In this illustrated example, since all the results of carrier sense $1501_{23}$ (not shown) to $1501_{30}$ are not higher than the threshold, the carrier sense control unit 212 decrements the value of the availability determination counter 1402. In other words, the value of the availability determination counter 1402 is 10−1=9 in accordance with the result of the fourth carrier sense $1501_{23}$. The value is decremented after each of the following carrier sense executions, and the value of the availability determination counter 1402 is 4−1=3 in accordance with the result of the ninth carrier sense $1501_{29}$. Finally, after decrementing in accordance with the result of the tenth carrier sense $1501_{30}$, the value of the availability determination counter 1402 is 2.

After decrementing, the carrier sense control unit 212 determines whether the value of the availability determination counter 1402 is 0 (see FIG. 18, S1810). In this particular example, since the value of the availability determination counter 1402 is 2, the carrier sense control unit 212 sets a "not available" flag in a carrier sense result table 400 as a result of a determination of the value of the availability determination counter 1402 (see FIG. 18, S1805).

By the carrier sense control unit 212 thus operating, an "available" flag is set only in the case in which the carrier sense result is not higher than a threshold in all the 10 successive carrier sense periods 1500, i.e. with all of the carrier sense 1501 performed in the carrier sense time. Otherwise a "not available" flag is set.

When First Initial Value is Set in Availability Determination Counter

Next, the change in a value of the availability determination counter is described when the first initial value, disclosed in the description of the after-transmission counter initialization process (FIG. 16, S1601), is set. FIG. 21 is a diagram showing a unit radio channel with a transmission/reception terminated shortly before the instant t0. FIG. 21A shows an example of a case in which the result of carrier sense 1501 for the unit radio channel is not higher than a threshold in all the 100 successive carrier sense periods 1500 occurring at instants t0 to t99.

FIG. 21A is a timing diagram showing executions of carrier sense on a unit radio channel. In this particular example, carrier sense $1501_{A1}$ to $1501_{A100}$ are executed on the unit radio channel at instants t0 to t99 (every 1 ms). It should be noted that, although omitted in FIG. 21A, carrier sense 1501 is performed also on other unit radio channels.

In this example, all the carrier sense results are assumed to be not higher than a threshold as a result of the carrier sense $1501_{A1}$ to $1501_{A100}$. FIG. 21B is a diagram showing the change in a value of the availability determination counter 1402 corresponding to the unit radio channel shown in FIG. 21A. Before the instant t0, the counter value for the unit radio channel was equal to the second initial value (10) since the channel was used for a transmission/reception.

At the instant t0, the carrier sense control unit 212 receives a signal, a command, or a message showing that the transmission/reception is terminated on the unit radio channel from a transmission/reception control unit 211. After performing the abovementioned after-transmission counter initialization process, the carrier sense control unit 212 sets the value of the availability determination counter to the first initial value (in this particular example, 100) (see FIG. 17. S1702).

Subsequently, the carrier sense control unit 212 receives a result of the first carrier sense $1501_{A1}$. In this illustrated example, since the result of carrier sense $1501_{A1}$ is not higher than the threshold, the carrier sense control unit 212 decrements the value of the availability determination counter (see FIG. 18, S1809). Thus, the value is 100−1=99. Subsequently, the carrier sense control unit 212 determines that the value of the availability determination counter 1402 is not 0 (see FIG. 18, S1810).

Subsequently, the second carrier sense period 1500 starts at the instant t1. The second carrier sense $1501_{A2}$ is performed on the unit radio channel in this period. The carrier sense control unit 212 receives a result of the second carrier sense $1501_{A2}$ from the reader/writer 20. In this illustrated example, since the result of carrier sense $1501_{A2}$ is not higher than the threshold, the carrier sense control unit 212 decrements the value of the availability determination counter 1402. Thus, the value is 99−1=98.

Similarly, the third to the hundredth carrier sense periods 1500 start at the instants t2 to t99. In the third to the hundredth carrier sense periods 1500, the reader/writer 20 executes the third to the hundredth carrier sense $1501_{A3}$ to $1501_{A100}$ on the unit radio channel, and outputs to the reader/writer control device 10 results of carrier sense $1501_{A3}$ to $1501_{A100}$.

The carrier sense control unit 212 of the reader/writer control device 10 receives results of the carrier sense $1501_{A3}$ to $1501_{A100}$ from the reader/writer 20. In this illustrated example, since all the results of carrier sense are not higher than the threshold, the carrier sense control unit 212 decrements the value of the availability determination counter 1402. In other words, the value of the availability determination counter 1402 is 98−1=97 in accordance with the result of the third carrier sense $1501_{A3}$. The value is decremented after each of the following carrier sense executions.

After decrementing in accordance with the result of the hundredth carrier sense $1501_{A100}$, the value of the availability determination counter 1402 is 1−1=0. Finally, after decrementing in accordance with the result of the hundredth carrier sense $1501_{A100}$, the value of the availability determination counter 1402 is 0.

After decrementing for each of the carrier sense $1501_{A100}$, the carrier sense control unit 212 determines whether the value of the availability determination counter 1402 is 0 (see FIG. 18, S1810). In this particular example, since the value of the availability determination counter 1402 is 0, the carrier sense control unit 212 sets an "available" flag in a carrier sense result table 400 as a result of a determination of the value of the availability determination counter 1402 (see FIG. 18, S1811).

By the carrier sense control unit 212 thus operating, an "available" flag is set only in a case in which the carrier sense result is not higher than a threshold in all the 100 successive carrier sense periods, i.e. with all of the carrier sense 1501 performed in the carrier sense time.

Next, the change in a value of the availability determination counter is described when a carrier sense period exceeds a threshold after the first initial value, which is disclosed in the description of the after-transmission counter initialization process, is set.

FIG. 22 is a diagram showing a unit radio channel with a transmission/reception terminated shortly before the instant t0. FIG. 22A shows an example of a case in which the result of carrier sense 1501 for the unit radio channel is not higher than a threshold in all the successive carrier sense periods 1500, except for one which occurred at instants t0 to t13.

FIG. 22A is, like FIG. 21A, a timing diagram showing executions of carrier sense on a unit radio channel. In this particular example, carrier sense $1501_{B1}$ to $1501_{B14}$ are executed on the unit radio channel at instants t0 to t13 (every 1 ms). It should be noted that, although omitted in FIG. 22A, carrier sense 1501 is performed also on other unit radio channels.

In this example, all the carrier sense results except $1501_{B3}$, i.e. carrier sense $1501_{B1}$, $1501_{B2}$, and $1501_{B4}$ (not shown) to $1501_{B13}$, are assumed to be not higher than a threshold.

FIG. 22B is a diagram showing the change in a value of the availability determination counter 1402 corresponding to the unit radio channel shown in FIG. 22A. Before the instant t0, the counter value for the unit radio channel was equal to the second initial value (in this particular example, 10) since the channel is used for a transmission/reception.

At the instant t0, the carrier sense control unit 212 receives a signal, a command, or a message showing that the transmission/reception is terminated on the unit radio channel from a transmission/reception control unit 211. After performing the abovementioned after-transmission counter initialization process (FIG. 16, S1601), the carrier sense control unit 212 sets the value of the availability determination counter to the first initial value (in this particular example, 100) (see FIG. 17. S1702). Subsequently, the carrier sense control unit 212 receives a result of the first carrier sense $1501_{B1}$. In this illustrated example, since the result of carrier sense $1501_{B1}$ is not higher than the threshold, the carrier sense control unit 212 decrements the value of the availability determination counter 1402 (see FIG. 18, S1809). Thus, the value is 100−1=99. Subsequently, the carrier sense control unit 212 determines that the value of the availability determination counter 1402 is not 0 (see FIG. 18, S1810).

Subsequently, the second carrier sense period 1500 starts at the instant t1. The second carrier sense $1501_{B2}$ is performed on the unit radio channel in this period. The carrier sense control unit 212 receives a result of the second carrier sense $1501_{B2}$ from the reader/writer 20. In this illustrated example, since the result of carrier sense $1501_{B2}$ is not higher than the threshold, the carrier sense control unit 212 decrements the value of the availability determination counter 1402. Thus, the value is 99−1=98.

Subsequently, the third carrier sense period 1500 starts at the instant t2. The third carrier sense $1501_{B3}$ is performed on the unit radio channel in this period. The carrier sense control unit 212 receives a result of the third carrier sense $1501_{B3}$ from the reader/writer 20. In this illustrated example, since the result of the third carrier sense $1501_{B3}$ exceeds the threshold, the carrier sense control unit 212 sets a "not available" flag in the carrier sense result table 400, and resets the value of the availability determination counter to the second initial value (in this example, 10) (see FIG. 18. S1806).

Subsequently, the fourth to the thirteenth carrier sense periods 1500 start at the instants t3 to t12. In the fourth to the thirteenth carrier sense periods 1500, the reader/writer 20 executes the fourth to the thirteenth carrier sense $1501_{B4}$ (not shown) to $1501_{B13}$ on the unit radio channel, and outputs to the reader/writer control device 10 the results thereof.

The carrier sense control unit 212 of the reader/writer control device 10 receives results of the fourth to the thirteenth carrier sense $1501_{B4}$ to $1501_{B13}$ from the reader/writer 20. In the displayed example, since all the results of carrier sense $1501_{B4}$ to $1501_{B13}$ are not higher than the threshold, the carrier sense control unit 212 decrements the value of the availability determination counter 1402. In other words, the value of the availability determination counter 1402 is 10−1=9 in accordance with the result of the fourth carrier sense $1501_{B4}$. In the following, the value of the counter is decremented corresponding to the result of each carrier sense. In this way, the value of the counter is decremented to 1 as the result of the twelfth carrier sense $1501_{B12}$. Then, in accordance with the result of the thirteenth carrier sense $1501_{B13}$, the value of the availability determination counter 1402 is 1−1=0.

After decrementing, the carrier sense control unit 212 determines whether the value of the availability determination counter 1402 is 0 (see FIG. 18, S1810). After the instant t12, since the value of the availability determination counter 1402 is 0, the carrier sense control unit 212 sets an "available" flag in a carrier sense result table 400 as a result of a determination of the value of the availability determination counter 1402 (see FIG. 18, S1811). With the carrier sense, according to the present invention, once the channel is used by another radio station and the like even before the elapse of transmission suspension period (before the elapse of the 100 carrier sense periods from the instant t0), the value of the availability determination counter 1402 becomes 0 as long as an interference wave which surpasses a threshold is not received within a standard carrier sense time, thereby setting an "available" flag in relation to the unit radio channel.

Since the carrier sense control unit 212 is thus operated, even after terminating transmission and before elapse of transmission suspension period, in a case in which, once the other reader/writer 20 uses and then release a unit radio channel, an "available" flag corresponding to the unit radio channel is set even before the elapse of the transmission suspension period, thereby enabling prompt transmission/reception of the system itself using the unit radio channel.

What is claimed is:

1. A control device capable of controlling a second RFID tag reader capable of using at least one of first unit radio channels available for a first RFID tag reader and at least one of second unit radio channels not available for the first RFID tag reader, the control device comprising:
   a radio channel control portion for assigning a unit radio channel used for transmission and reception with an RFID to the second RFID tag reader; and
   a carrier sense control portion for receiving information indicative of a received radiowave strength in each of unit radio channels measured by the second RFID tag reader, storing information indicative of availability of each of the unit radio channels based on the information indicative of the received radiowave strength,
   wherein the radio channel control portion determines whether any one of the second unit radio channels is available based on the information indicative of availability of each of the unit radio channels, determines whether any one of the first unit radio channels is available in a case in which it is determined that any one of the second unit radio channels is not available, and assigns a unit radio channel for transmission and reception to the second RFID tag reader based on the result of the determinations.

2. A control device according to claim 1, wherein in a case in which a continuous transmission time, for which the same unit radio channel can be continuously used after the unit radio channel used for transmission and reception with the second RFID tag reader has been assigned and the transmission and reception has been started, has elapsed, the radio channel control portion assigns another unit radio channel different from the unit radio channel so far used for transmission and reception.

3. A control device according to claim 1, wherein the radio channel control portion assigns another unit radio channel for transmission and reception to the second RFID tag after a continuous transmission time, for which the same unit radio channel can be continuously used after the unit radio channel used for transmission and reception with the second RFID tag reader has been assigned and the transmission and reception has been started, has elapsed without waiting for a transmission suspension period.

4. A control device according to claim 1, wherein the carrier sense control portion assigns unit radio channels for carrier sense to the second RFID tag reader so that the second RFID tag reader performs carrier sense on each of the unit radio channels.

5. An RFID tag reading system for reading an RFID tag using a second RFID tag reader capable of using at least one of first unit radio channels available for a first RFID tag reader and at least one of second unit radio channels not available for the first RFID tag reader;
   a second RFID tag reader for communicating with an RFID tag using any one of the first unit radio channel and the second unit radio channel, measuring received radiowave strength in each of unit radio channels, and outputting information indicative of the result of measurement; and
   a control device for assigning a unit radio channel used for transmission and reception with the RFID tag to the second RFID tag reader, receiving information indicative of a received radiowave strength in each of unit radio channels measured by the second RFID tag reader, storing information indicative of availability of each of the radio channels based on the information indicative of the received radiowave strength, determining whether any one of the second unit radio channels is available based on the information indicative of availability of each of the unit radio channels, determining whether any one of first unit radio channels is available in a case in which it is determined that any one of the second unit radio channels is not available, and assigning a unit radio channel for transmission and reception to the second RFID tag reader based on the result of the determinations.

6. An RFID tag reading system according to claim 5, wherein in a case in which a continuous transmission time, for which the same unit radio channel can be continuously used after the unit radio channel used for transmission and reception with the second RFID tag reader has been assigned and the transmission and reception has been started, has elapsed, the control device assigns another unit radio channel different from the unit radio channel so far used for transmission and reception.

7. An RFID tag reading system according to claim 5, wherein the control device assigns another unit radio channel for transmission and reception to the second RFID tag reader after a continuous transmission time has, for which the same unit radio channel can be continuously used after the unit radio channel used for transmission and reception with the second RFID tag reader has been assigned and the transmission and reception has been started, elapsed without waiting for a transmission suspension period.

8. An RFID tag reading system according to claim 5, wherein the control device assigns unit radio channels for carrier sense to the second RFID tag reader so that the second RFID tag reader performs carrier sense on each of the unit radio channels.

9. An RFID tag reader for reading an RFID tag capable of using at least one of first unit radio channels available for an other RFID tag reader and at least one second of unit radio channels not available for the other RFID tag reader, comprising:
   a first oscillation portion for generating a signal with a frequency corresponding to a unit radio channel used for transmission and reception with an RFID tag;
   a transmission and reception portion for carrying out transmission and reception with the RFID tag using a signal generated by the first oscillation portion;
   a second oscillation portion for generating a signal with a frequency variably corresponding to each of unit radio channels in response to a unit radio channel to be measured for a received radio strength;
   a carrier sense portion for measuring a received radiowave strength on each of the unit radio channels using a signal generated by the second oscillation portion; and
   a control portion for selecting a next unit radio channel to be used for the transmission and reception portion based on the result of measurement made by the carrier sense portion, and controlling the first oscillation portion to generate a carrier signal with a frequency corresponding to the unit radio channel thus selected,
   wherein the control portion determines whether any one of the second unit radio channels is available, and determines whether any one of the first unit radio channels is available in a case in which it is determined that any one of the second unit radio channels is not available.

* * * * *